United States Patent
Suh

(10) Patent No.: US 12,464,330 B2
(45) Date of Patent: Nov. 4, 2025

(54) DEVICE AND METHOD FOR PROVIDING EMERGENCY CALL SERVICE IN WIRELESS COMMUNICATION NETWORK

(71) Applicant: Samsung Electronics Co., Ltd., Suwon-si (KR)

(72) Inventor: Kyungjoo Suh, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 433 days.

(21) Appl. No.: 17/971,888

(22) Filed: Oct. 24, 2022

(65) Prior Publication Data

US 2023/0133387 A1    May 4, 2023

(30) Foreign Application Priority Data

Oct. 29, 2021    (KR) .................. 10-2021-0147155

(51) Int. Cl.
*H04W 4/90*    (2018.01)
*H04W 8/02*    (2009.01)
(Continued)

(52) U.S. Cl.
CPC ............... *H04W 4/90* (2018.02); *H04W 8/02* (2013.01); *H04W 8/26* (2013.01); *H04W 16/16* (2013.01); *H04W 76/50* (2018.02); *H04W 84/105* (2013.01)

(58) Field of Classification Search
CPC ............ H04W 4/90; H04W 8/02; H04W 8/26
See application file for complete search history.

(56) References Cited

U.S. PATENT DOCUMENTS

| 2007/0060097 A1 | 3/2007 | Edge et al. |
| 2020/0100085 A1 | 3/2020 | Buckley et al. |

(Continued)

FOREIGN PATENT DOCUMENTS

| EP | 3 644 686 A1 | 4/2020 |
| WO | 2020/202078 A1 | 10/2020 |
| WO | 2020/256414 A1 | 12/2020 |

OTHER PUBLICATIONS

Arnez—Analysis of Emergency Call Tracking (Year: 2022).*

(Continued)

*Primary Examiner* — Jinsong Hu
*Assistant Examiner* — Justin Barry
(74) *Attorney, Agent, or Firm* — Jefferson IP Law, LLP

(57) ABSTRACT

The disclosure relates to a fifth-generation (5G) or sixth-generation (6G) communication system for supporting a higher data transmission rates. A method by a user equipment (UE) configured to perform an emergency call in a non-public network is provided. The method includes receiving, from an access and mobility management function (AMF), information related to at least one supported non-public network and information indicating whether the at least one supported non-public network supports an emergency call, transmitting, to the AMF, a registration request message including information indicating that the UE requests an emergency call service in a non-public network, receiving, from the AMF, a registration accept message including an emergency call number, identifying whether the registration accept message includes information indicating that the non-public network supports the emergency call service, and performing the emergency call in the non-public network based on a result of the identification.

12 Claims, 9 Drawing Sheets

(51) Int. Cl.
*H04W 8/26* (2009.01)
*H04W 16/16* (2009.01)
*H04W 76/50* (2018.01)
*H04W 84/10* (2009.01)

(56) References Cited

U.S. PATENT DOCUMENTS

| | | | |
|---|---|---|---|
| 2020/0100202 A1 | 3/2020 | Bakker | |
| 2020/0128460 A1* | 4/2020 | Takakura | H04W 36/16 |
| 2020/0305224 A1* | 9/2020 | Chong | H04W 36/24 |
| 2020/0396792 A1 | 12/2020 | Tiwari et al. | |
| 2021/0176817 A1* | 6/2021 | Takakura | H04L 65/1069 |
| 2021/0211975 A1* | 7/2021 | Prabhakar | H04W 8/06 |
| 2021/0219122 A1* | 7/2021 | Buckley | H04W 60/00 |
| 2022/0360962 A1* | 11/2022 | Tseng | H04W 8/183 |
| 2022/0361098 A1* | 11/2022 | Shih | H04W 60/04 |

OTHER PUBLICATIONS

Li et al., "An Overview of 5G System Accessibility Differentiation and Control" [retrieved Jul. 1, 2025] (Year: 2021).*
Qualcomm Incorporated et al., Support for IMS emergency services over SNPN, S2-2104579, 3GPP TSG-SA WG2 Meeting #145-e (e-meeting), Jun. 4, 2021, XP052021090, Elbonia.
European Search Report dated Nov. 15, 2024, issued in European Application No. 22887495.4.
VIVO, SNPN UE accessing emergency services in PLMN, S2-2107312, 3GPP TSG-SA2 Meeting #147E (e-meeting) section K.3, Oct. 11, 2021.
International Search Report dated Jan. 20, 2023, issued in International Application No. PCT/KR2022/016105.

* cited by examiner

DEVICE AND METHOD FOR PROVIDING EMERGENCY CALL SERVICE IN WIRELESS COMMUNICATION NETWORK

CROSS-REFERENCE TO RELATED APPLICATION(S)

This application is based on and claims priority under 35 U.S.C. § 119(a) of a Korean patent application number 10-2021-0147155, filed on Oct. 29, 2021, in the Korean Intellectual Property Office, the disclosure of which is incorporated by reference herein in its entirety.

BACKGROUND

1. Field

The disclosure relates to a device and method for providing an emergency call service in a wireless communication network. More particularly, the disclosure relates to a device and method for providing an emergency call service in a non-public network.

2. Description of Related Art

Fifth-generation (5G) mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement sixth-generation (6G) mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced Mobile BroadBand (eMBB), Ultra Reliable Low Latency Communications (URLLC), and massive Machine-Type Communications (mMTC), there has been ongoing standardization regarding beamforming and massive multiple-input and multiple-output (MIMO) for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of BandWidth Part (BWP), new channel coding methods such as a Low Density Parity Check (LDPC) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as Vehicle-to-everything (V2X) for aiding driving determination by autonomous vehicles based on information regarding positions and states of vehicles transmitted by the vehicles and for enhancing user convenience, New Radio Unlicensed (NR-U) aimed at system operations conforming to various regulation-related requirements in unlicensed bands, NR user equipment (UE) Power Saving, Non-Terrestrial Network (NTN) which is UE-satellite direct communication for providing coverage in an area in which communication with terrestrial networks is unavailable, and positioning.

Moreover, there has been ongoing standardization in air interface architecture/protocol regarding technologies such as Industrial Internet of Things (IIoT) for supporting new services through interworking and convergence with other industries, Integrated Access and Backhaul (IAB) for providing a node for network service area expansion by supporting a wireless backhaul link and an access link in an integrated manner, mobility enhancement including conditional handover and Dual Active Protocol Stack (DAPS) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting Augmented Reality (AR), Virtual Reality (VR), Mixed Reality (MR) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, meta-material-based lenses and antennas for improving coverage of terahertz band signals, high-dimensional space multiplexing technology using Orbital Angular Momentum (OAM), and Reconfigurable Intelligent Surface (RIS), but also full-duplex technology for increasing frequency efficiency of 6G mobile communication technologies and improving system networks, AI-based communication technology for implementing system optimization by utilizing satellites and AI from the design stage and internalizing end-to-end AI support functions, and next-generation distributed computing technology for implementing services at levels of complexity exceeding the limit of UE operation capability by utilizing ultra-high-performance communication and computing resources.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a device and method for providing an emergency call service in a wireless communication network.

Another aspect of the disclosure is to provide a device and method for providing an emergency call service in a wireless communication system that provides a non-public network.

Additional aspects will be set forth in part in the description which follows and, in part, will be apparent from the description, or may be learned by practice of the presented embodiments.

In accordance with an aspect of the disclosure, a method by a user equipment (UE) configured to perform an emergency call in a non-public network is provided. The method includes receiving, from an access and mobility management function (AMF), information related to at least one supported non-public network and information indicating whether the at least one supported non-public network supports an emergency call, transmitting, to the AMF, a registration request message including information indicating that the UE requests an emergency call service in a non-public network, receiving, from the AMF, a registration accept message including an emergency call number, identifying whether the registration accept message includes information indicating that the non-public network supports the emergency call service, and performing the emergency call in the non-public network based on a result of the identification.

In accordance with another aspect of the disclosure, a method performed by an AMF in a non-public network is provided. The method includes transmitting, to a UE, information related to at least one supported non-public network and information indicating whether the at least one supported non-public network supports an emergency call, receiving, from the UE, a registration request message including information indicating that the UE requests an emergency call service in a non-public network, and transmitting, to the UE, a registration accept message including an emergency call number in response to the registration request message, wherein the registration accept message further includes information indicating that the non-public network supports the emergency call service.

In accordance with another aspect of the disclosure, a UE configured to perform an emergency call in a non-public network is provided. The UE includes a transceiver and a processor configured to receive, from an access and mobility management function (AMF) through the transceiver, information related to at least one supported non-public network and information indicating whether the at least one supported non-public network supports an emergency call, transmit, to the AMF through the transceiver, a registration request message including information indicating that the UE requests an emergency call service in a non-public network, receive, from the AMF through the transceiver, a registration accept message including an emergency call number, identify whether the registration accept message includes information indicating that the non-public network supports the emergency call service, and perform the emergency call in the non-public network based on a result of the identification.

In accordance with another aspect of the disclosure, an AMF in a non-public network is provided. The AMF includes a transceiver and a processor configured to transmit, to a UE through the transceiver, information related to at least one supported non-public network and information indicating whether the at least one supported non-public network supports an emergency call, receive, from the UE, a registration request message including information indicating that the UE requests an emergency call service in a non-public network, and transmit, to the UE, a registration accept message including an emergency call number in response to the registration request message, wherein the registration accept message further includes information indicating that the non-public network supports the emergency call service.

In accordance with another aspect of the disclosure, a method performed by a user equipment (UE) in a wireless communication network is provided. The method includes receiving system information including first information related to an emergency call service and information related to a first network from a network device, transmitting, to the network device, a registration request message including information indicating that the first network requests the emergency call service and second information related to the emergency call service, and receiving, from the network device, a registration accept message which is a response message to the registration request message, wherein the registration accept message includes at least one of information indicating that the first network supports the emergency call service and an emergency call number or emergency call support area-related information, related to the emergency call service, provided from the first network.

In accordance with another aspect of the disclosure, a method performed by a network device in a wireless communication network is provided. The method includes receiving, from a user equipment (UE), a registration request message including information indicating that the first network requests an emergency call service and information related to the emergency call service, and transmitting, to the UE, a registration accept message which is a response message to the registration request message, wherein the registration accept message includes at least one of information indicating that the first network supports the emergency call service and an emergency call number or emergency call support area-related information, related to the emergency call service, provided from the first network.

In accordance with another aspect of the disclosure, a user equipment (UE) in a wireless communication network is provided. The UE includes a transceiver and a processor configured to receive system information including first information related to an emergency call service and information related to a first network from a network device through the transceiver, transmit, to the network device through the transceiver, a registration request message including information indicating that the first network requests the emergency call service and second information related to the emergency call service, and receive, from the network device through the transceiver, a registration accept message which is a response message to the registration request message, wherein the registration accept message includes at least one of information indicating that the first network supports the emergency call service and an emergency call number or emergency call support area-related information, related to the emergency call service, provided from the first network.

In accordance with another aspect of the disclosure, a network device in a wireless communication network is provided. The network includes a transceiver and a processor configured to receive, from a user equipment (UE) through the transceiver, a registration request message including information indicating that the first network requests an emergency call service and information related to the emergency call service, and transmit, to the UE through the transceiver, a registration accept message which is a response message to the registration request message, wherein the registration accept message includes at least one of information indicating that the first network supports the emergency call service and an emergency call number or emergency call support area-related information, related to the emergency call service, provided from the first network.

According to an embodiment of the disclosure, it is possible to efficiently provide an emergency call service in a wireless communication system that provides a non-public network.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

DETAILED DESCRIPTION

Figure 1A:
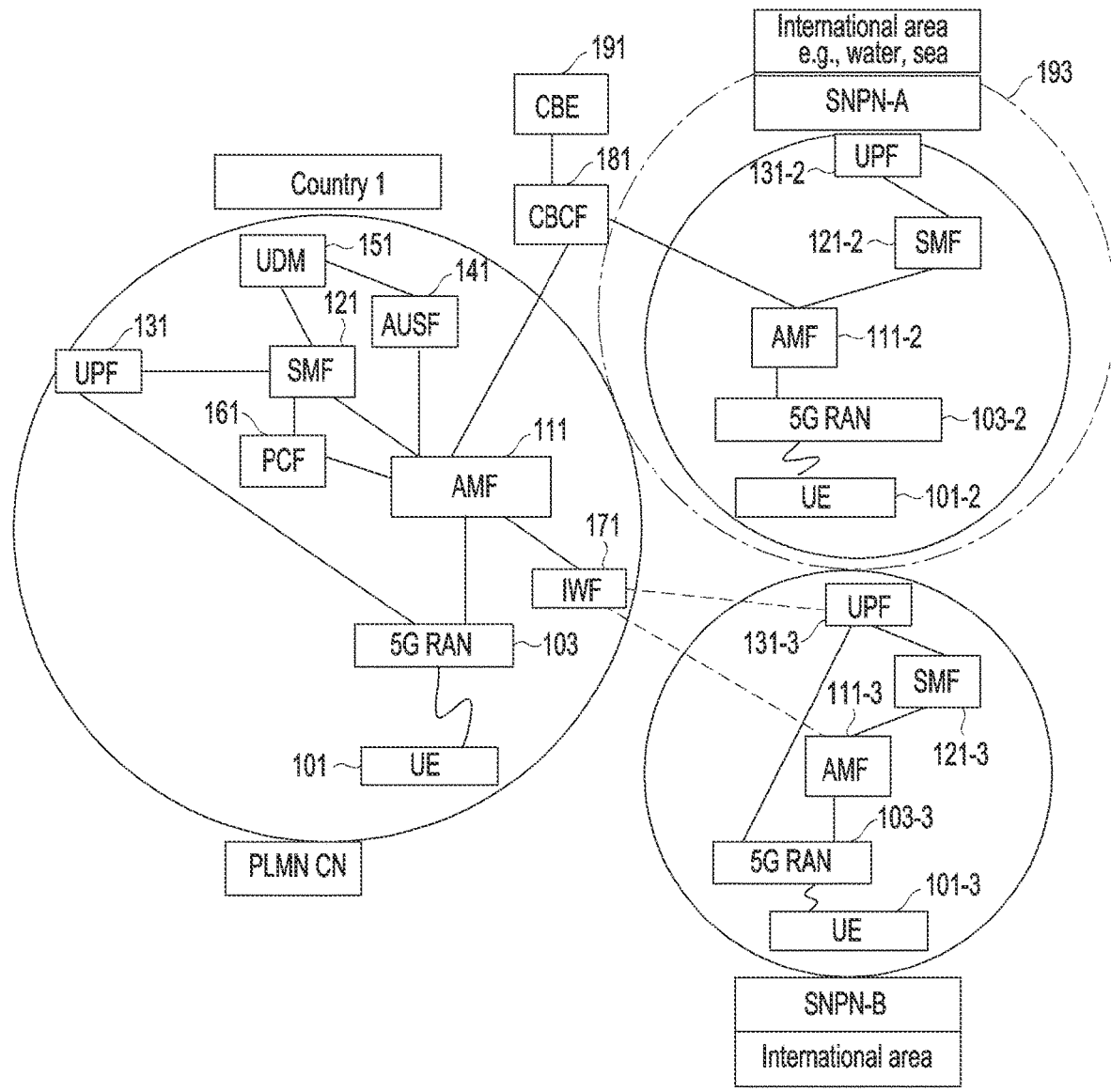
FIG. 1A is a view illustrating an example of an environment for providing an emergency call service in a wireless communication network according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit to the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

For the same reasons, some elements may be exaggerated or schematically shown. The size of each element does not necessarily reflect the real size of the element. The same reference numeral is used to refer to the same element throughout the drawings.

Advantages and features of the disclosure, and methods for achieving the same may be understood through the embodiments to be described below taken in conjunction with the accompanying drawings. However, the disclosure is not limited to the embodiments disclosed herein, and various changes may be made thereto. The embodiments disclosed herein are provided only to inform one of ordinary skilled in the art of the category of the disclosure. The disclosure is defined only by the appended claims. The same reference numeral denotes the same element throughout the specification.

It should be appreciated that the blocks in each flowchart and combinations of the flowcharts may be performed by computer program instructions.

Further, each block may represent a module, segment, or part of a code including one or more executable instructions for executing a specified logical function(s). Further, it should also be noted that in some replacement execution examples, the functions mentioned in the blocks may occur in different orders. For example, two blocks that are consecutively shown may be performed substantially simultaneously or in a reverse order depending on corresponding functions.

As used herein, the term "unit" means a software element or a hardware element such as a field-programmable gate array (FPGA) or an application specific integrated circuit (ASIC). A unit plays a certain role. However, the term "unit" is not limited as meaning a software or hardware element. A 'unit' may be configured in a storage medium that may be addressed or may be configured to reproduce one or more processors. Accordingly, as an example, a 'unit' includes elements, such as software elements, object-oriented software elements, class elements, and task elements, processes, functions, attributes, procedures, subroutines, segments of program codes, drivers, firmware, microcodes, circuits, data, databases, data architectures, tables, arrays, and variables. A function provided in an element or a 'unit' may be combined with additional elements or may be split into sub elements or sub units. Further, an element or a 'unit' may be implemented to reproduce one or more central processing units (CPUs) in a device or a security multimedia card. According to embodiments, a " . . . unit" may include one or more processors.

According to embodiments of the disclosure, the base station may be an entity allocating resource to a user equipment (UE) and may be at least one of gNode B, gNB, eNode B, eNB, Node B, base station (BS), wireless access unit, base station controller, or node over network. The base station may be a network entity including at least one of an integrated access and backhaul-donor (IAB-donor), which is a gNB providing network access to UE(s) through a network of backhaul and access links in the new radio (NR) system, and an IAB-node, which is a radio access network (RAN) node supporting NR backhaul links to the IAB-donor or another IAB-node and supporting NR access link(s) to UE(s). The UE is wirelessly connected through the IAB-node and may transmit/receive data to and from the IAB-donor connected with at least one IAB-node through the backhaul link.

The UE may include a terminal, mobile station (MS), cellular phone, smartphone, computer, or various devices capable of performing communication functions. In the disclosure, downlink (DL) refers to a wireless transmission path of signal transmitted from the base station to the terminal, and uplink (UL) refers to a wireless transmission path of signal transmitted from the terminal to the base station.

The description of embodiments of the disclosure focuses primarily on the radio access network, new RAN, and the core network, packet core (5th generation (5G) system, or 5G core network, or NG core, or next generation core), which are specified by the 3rd generation partnership (3GPP) which is a wireless communication standardization organization. However, the subject matter of the disclosure, or slight changes thereto, may also be applicable to other communication systems that share similar technical backgrounds without departing from the scope of the disclosure, which would readily be appreciated by one of ordinary skill in the art.

As used herein, terms for identifying access nodes, terms denoting network entities, terms denoting messages, terms denoting inter-network entity interfaces, and terms denoting various pieces of identification information are provided as an example for ease of description. Thus, the disclosure is not limited to the terms, and the terms may be replaced with other terms denoting objects with equivalent technical meanings.

In the disclosure, eNB may be used interchangeably with gNB for convenience of description. In other words, the base station described as an eNB may represent a gNB. In this disclosure, the term UE may refer to mobile phones, narrow band-Internet of things (NB-IoT) devices, sensors, as well as various wireless communication devices.

In the 5G or NR system, the access and mobility management function (AMF), which is a management entity that manages the mobility of the UE, and the session management function (SMF), which is an entity that manages the session, are separated. Accordingly, unlike in the 4G LTE communication system, where the mobility management entity (MME) performs both mobility management and session management, in the 5G or NR system, an entity performing mobility management and an entity performing session management are separately provided, so that the communication method and communication management method between the UE and the network entity have been changed.

For non-3GPP access, the 5G or NR system performs mobility management through the AMF via the non-3GPP inter-working function (N2IWF) and performs session management through the SMF. Further, the 5G or NR system processes security-related information, which is an important element in mobility management, through AMF.

As described above, in the 4G LTE system, the MME is in charge of both mobility management and session management. The 5G or NR system may support a non-standalone architecture that performs communication using the network entities of the 4G LTE system together.

Various embodiments of the disclosure may provide a device and method for providing an emergency call service in a wireless communication system that provides a non-public network service.

Figure 1B:
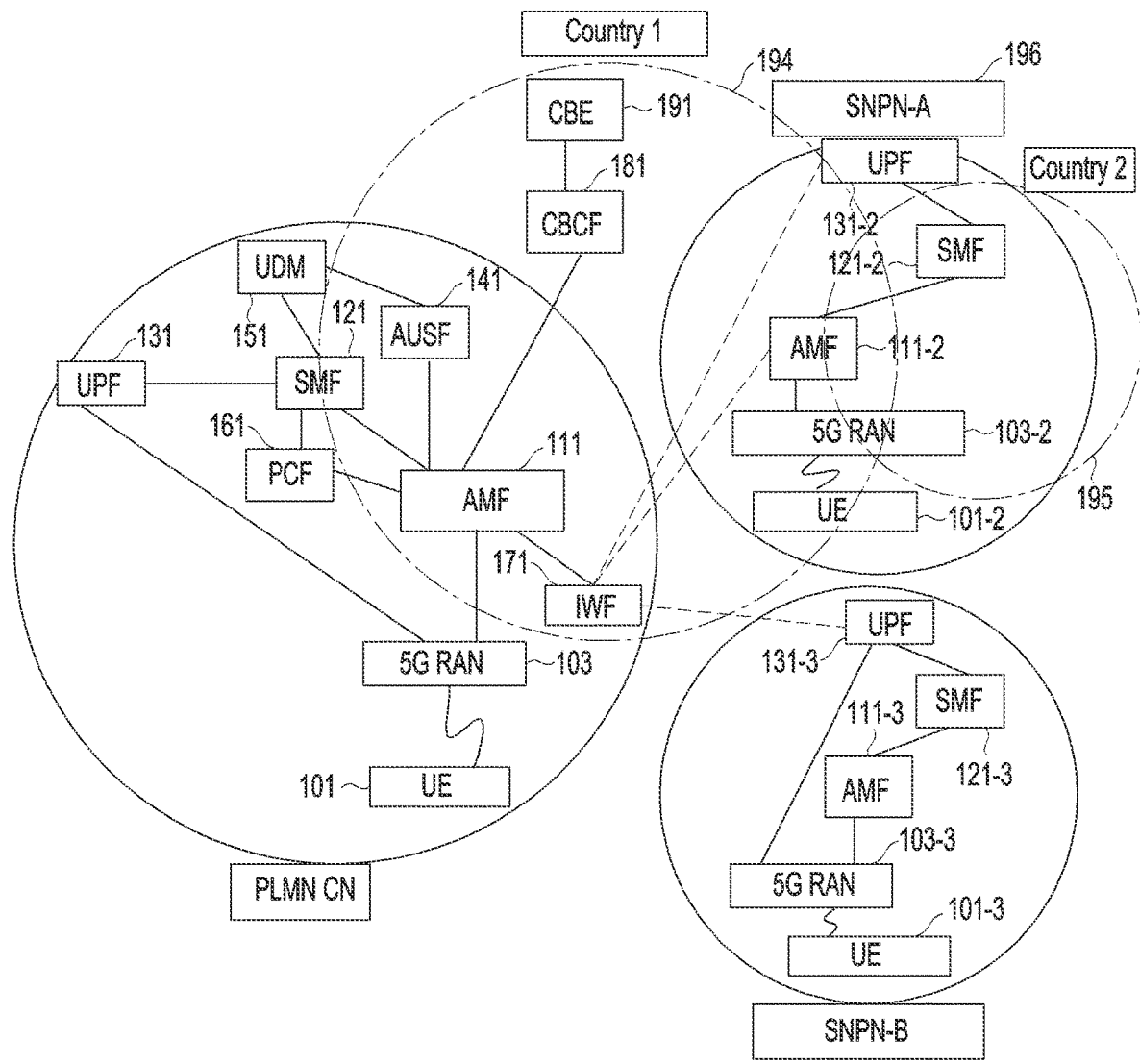
FIG. 1B is a view illustrating another example of an environment for providing an emergency call service in a wireless communication network according to an embodiment of the disclosure.
Figure 1C:
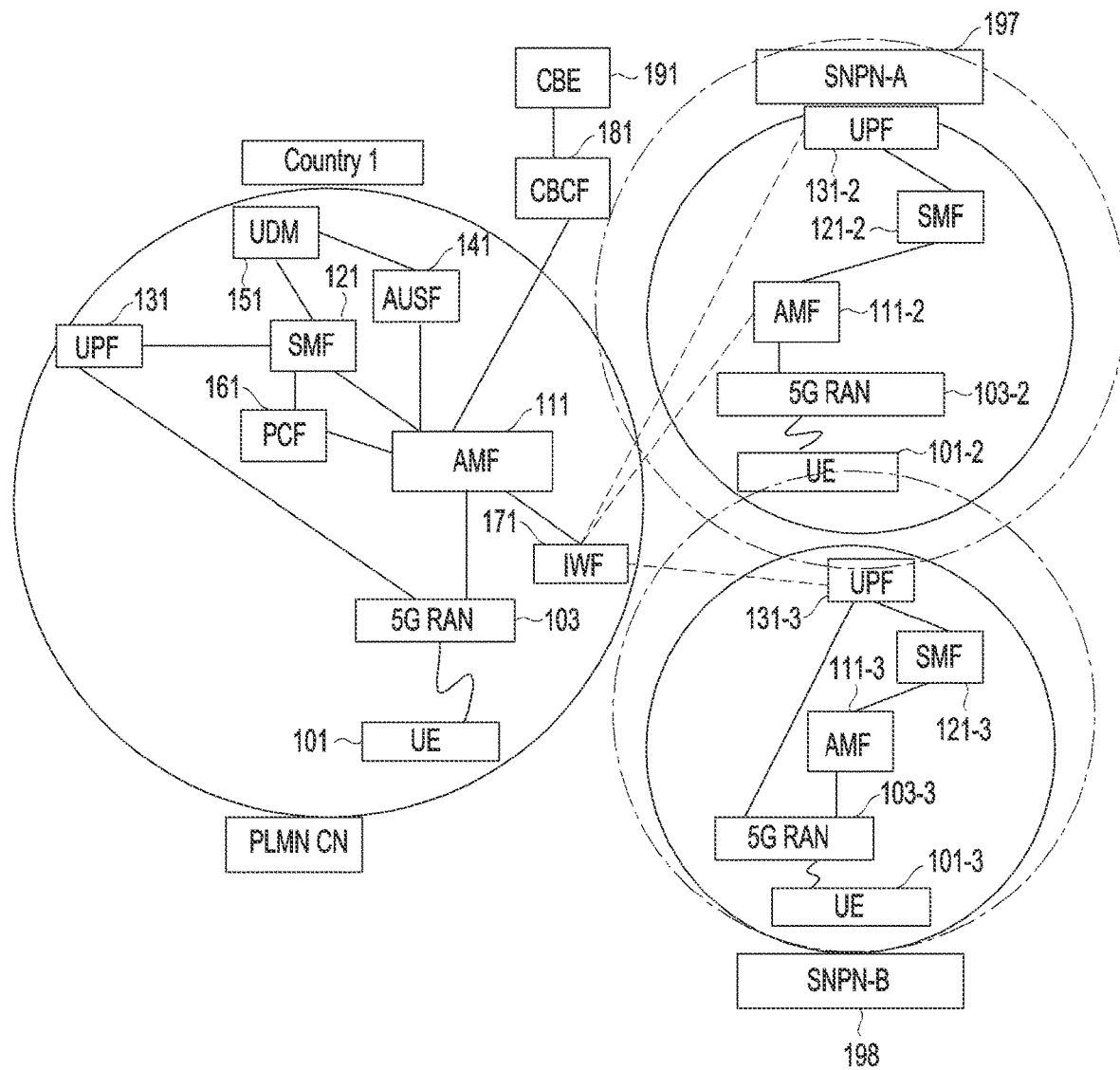
FIG. 1C is a view illustrating another example of an environment for providing an emergency call service in a wireless communication network according to an embodiment of the disclosure.

FIGS. 1A to 1C are views schematically illustrating examples of a structure of a wireless communication network according to various embodiments of the disclosure.

Referring to FIGS. 1A to 1C, a wireless communication network may be a 5G or NR network. The 5G or NR core network (CN) may include network functions (NFs), such as user plane functions (UPFs) 131, 131-2, and 131-3, SMFs 121, 121-2, and 121-3, AMFs 111, 111-2, and 111-3, 5G radio access networks (RANs) 103, 103-2, and 103-3, a user data management (UDM) 151, and a policy control function (PCF) 161. Further, for authentication of these entities, the 5G or NR core network may include an authentication server function (AUSF) 141 and entities, such as for authentication, authorization and accounting (AAA). Hereinafter, for convenience of description, the NF may also be referred to as an "NF device". In an embodiment, the NF and/or the NF device may be implemented in one or more specific servers, or two or more NFs performing the same operation may be implemented in one server.

The UE may access the 5G core network through a base station (5G RAN or BS). Meanwhile, when the N3IWF exists for the case where the UE communicates through non-3GPP access, and the UE communicates through non-3GPP access, session management is controlled through the UE, non-3GPP access, N3IWF, and SMF, and mobility management is controlled through the UE, non-3GPP access, N3IWF, and AMF.

In the 5G or NR system, entities performing mobility management and session management exist separately, and the entity performing mobility management is the AMF, and the entity performing session management is the SMF. Meanwhile, the 5G or NR system is considering a standalone (SA) deployment structure that communicates only with 5G or NR entities and a non-standalone (NSA) deployment structure that uses 4G entities and 5G or NR entities together.

As shown in FIGS. 1A to 1C, when the UE communicates with the network, there may be a deployment in such a form that control operation is performed by the eNB, and the 5G entity of the core network is used. In this case, mobility management between the UE and the AMF and session management between the UE and the SMF may be performed by the non-access stratum (NAS) layer, which is layer 3.

FIGS. 1A to 1C illustrate environments for supporting an emergency call service when a public land mobile network (PLMN) and a stand-alone non-public network (SNPN), i.e., non-public network, coexist in the wireless communication network.

FIG. 1A illustrates a wireless communication network environment when the UE accesses the SNPN in the area with, e.g., a mobile country code (MCC) starting with "9xx."

The wireless communication network environment shown in FIG. 1A is a wireless communication network environment when a UE 101-2 is located in an international area 193 which is not identified with a specific country code or an island on the sea, and the UE 101-2 accesses the SNPN in the international area 193.

FIG. 1B illustrates a wireless communication network environment where the UE accesses the SNPN 196 located in the border area between two countries 194 and 195. In this case, emergency call information about the two countries may be all available, the emergency call information about one of the two countries may be available, or the emergency call information about the two countries may be unavailable.

FIG. 1C illustrates a wireless communication network environment when the UE which is connected to an SNPN 197 in one country moves to the other SNPN 198. In this case, the emergency call information about multiple SNPNs in one country may be all available, or the emergency call information about one or specific SNPNs among the multiple SNPNs may be available. Or, the emergency call information for any SNPN among the multiple SNPNs may not be available.

It should be noted that FIGS. 1A to 1C illustrate that the UEs 101, 101-2, and 101-3 are the same UE which is denoted as UE 101 when connected to the PLMN, UE 101-2 when connected to SNPN-A, and UE 101-2 when connected to SNPN-B. In the following description, for convenience of description or illustration, the UE 101, the UE 101-2, and/or the UE 101-3 may be denoted as the UE 101 and it should be noted that depending on the context of the wireless communication network, the UE 101 may be interpreted as the UE 101 when connected to the PLMN, the UE 101-2 when connected to SNPN-A, and/or the UE 101-3 when connected to SNPN-B.

Referring to FIGS. 1A to 1C, the PLMN CN includes a 5G RAN 103, an AMF 111, an SMF 121, a UPF 131, an AUSF 141, a UDM 151, a PCF 161, and/or an IWF 171.

Referring to FIGS. 1A to 1C, SNPN-A includes a 5G RAN 103-2, an AMF 111-2, an SMF 121-2, and/or a UPF 131-2. In FIGS. 1A to 1C, SNPN-A includes a 5G RAN 103-2, but the 5G-RAN 103-2 may also be implemented as a node capable of non-3GPP access as well as 5G-RAN.

Referring to FIGS. 1A to 1C, SNPN-B may include a 5G RAN 103-3, an AMF 111-3, an SMF 121-3, and/or a UPF 131-3. In FIGS. 1A to 1C, SNPN-B includes a 5G RAN 103-3, but the 5G-RAN 103-3 may also be implemented as a node capable of non-3GPP access as well as 5G-RAN.

Figure 2:
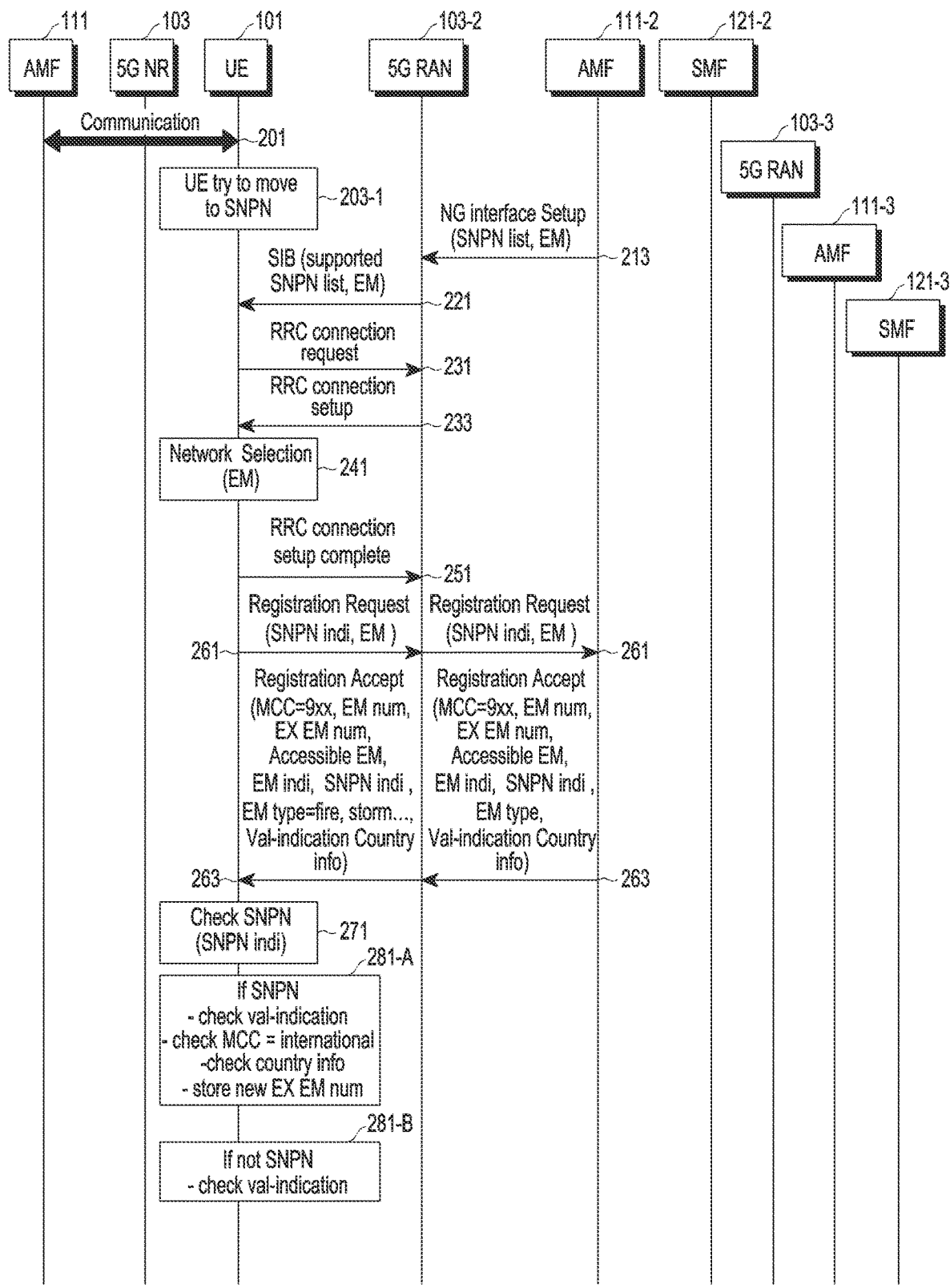
FIG. 2 is a signal flowchart schematically illustrating a procedure for providing an emergency call service in a wireless communication network according to an embodiment of the disclosure.

FIG. 2 is a signal flowchart schematically illustrating a procedure for providing an emergency call service in a wireless communication network according to an embodiment of the disclosure.

The procedure for providing an emergency call service shown in FIG. 2 may be a procedure for providing an emergency call service in an environment in which a general communication PLMN and an SNPN, i.e., a non-public network, coexist in a wireless communication network (e.g., a 5G network). The procedure for providing an emergency call service illustrated in FIG. 2 may be a procedure for providing an emergency call service in the wireless communication network environment described with reference to FIG. 1A.

FIG. 2 is a signal flowchart illustrating a procedure for efficiently transferring various messages, such as a public warning system (PWS) message, a commercial mobile alert system (CMAS) message, or disaster text warning system (earthquake and tsunami warning system (ETWS)), such as for a fire, an earthquake, tsunami, heavy rain, storm, heavy snow, or disease, emergency disaster messages, in an environment where a general 5G communication network and a non-public network coexist according to an embodiment of the disclosure. Hereinafter, a specific term, such as PWS, may be used, but CMAS, ETWS, etc. may be applied instead of PWS.

The signal flowchart for providing an emergency call service as shown in FIG. 2 may be a signal flowchart for providing an emergency call service that may be used by the AMF or 5G NG-RAN present in the non-public network, rather than the AMF or 5G NG-RAN present in the 3GPP operator network, i.e., general public network.

As described in connection with FIG. 1A, SNPN-A may support both PWS and emergency call and may include at least one of the AMF 111-2 and the 5G RAN 103-2 (e.g., 5G NR base station). In this case, the disaster message may be transferred through the path of the cell broadcast entity (CBE) 191, the cell broadcast center function (CBCF) 181, the AMF 111-2 of SNPN-A, and the 5G NG-RAN 103-2 of SNPN-A.

The 5G RAN may broadcast the received cell broadcast service (CBS) message to the UE existing in the 5G RAN cell.

Meanwhile, in the wireless communication network environment of FIG. 1A, the following various examples may be implemented depending on whether SNPN may directly support PWS, CMAS, and emergency call services.

SNPN-A is an SNPN that may support services, such as PWS, CMAS, and emergency call.

SNPN-B is an SNPN that does not directly support services, such as PWS, CMAS, and emergency call.

SNPN-A or SNPN-B is an SNPN that supports PWS but does not support emergency call.

As another example,

SNPN-A or SNPN-B is an SNPN that supports emergency call, but does not support PWS.

In the disclosure, various embodiments are possible according to the shape of the radio RAN section supported by the SNPN in FIG. 1A.

The access network section of SNPN may be 5G RAN, that is, NG RAN.

The access network section of the SNPN may be a non-3GPP access network.

In operation 201, the UE 101 is performing communication in the communication carrier's public network, i.e., a general PLMN.

In operation 203-1, the UE 101 attempts to move to a standalone non-public network corresponding to a private network while performing communication in the communication carrier's general public network.

Described below is an operation in which the UE 101 moves from the public network to a non-public network which has an agreement with the communication carrier to which the UE 101 subscribes, or a non-public network allowing access or registration of the UE 101 to receive a service.

In operation 213, the AMF 111-2 of SNPN-A may previously provide the 5G RAN 103-2 with at least one of pieces of information, such as SNPN list, indication as to whether PWS is supported, or PWS support-related information, and emergency support (EM) indication as to whether emergency call is supported, through NG interface setup. In an embodiment, the SNPN list may include information related to SNPNs supported by the AMF 111-2. For example, the SNPN list may include identifiers of SNPNs where the AMF 111-2 may provide a service to the UE 101.

In an embodiment, the SNPN list may include list information about identifiers (SNPN-IDs) for identifying SNPNs, or SNPN identifier information.

For example, operation 213 may be performed in the process of setting up the SNPN before evaluating and determining whether the AMF 111-2 supports the emergency call service for the UE 101.

In operation 221, the 5G RAN 103-2 receiving the SNPN list and PWS-related information from the AMF 111-2 may transmit the SNPN list supported by the corresponding SNPN, e.g., SNPN-A, PWS-related information, and information about whether emergency call is supported, through a system information block (SIB), to the UE 101. In an embodiment, the SNPN list may include information related to SNPNs supportable by the AMF 111-2. For example, the SNPN list may include identifiers of SNPNs where the AMF 111-2 may provide a service to the UE 101. In an embodiment, the SNPN list may include list information about identifiers (SNPN-IDs) for identifying SNPNs, or SNPN identifier information.

In operation 231, the UE 101 may transmit a radio resource control (RRC) connection request message to the 5G RAN 103-2. In operation 231, the UE 101 in the idle state may attempt an RRC connection with the 5G RAN 103-2 to attempt a call, attempt data transmission, or respond to paging.

In operation 233, the UE 101 may receive an RRC connection setup message that is a response message to the RRC connection request message from the 5G RAN 103-2. For example, when the 5G RAN 103-2 accepts the RRC connection request of the UE 101, the UE 101 may receive an RRC connection setup message from the 5G RAN 103-2. The 5G RAN 103-2 of SNPN-A may transmit an RRC connection setup message to the UE 101 attempting to access the 5G network.

In operation 241, the UE 101 may perform the following process in relation to selection of a network (e.g., PLMN or SNPN) to request for registration. As an example, the PLMN may be identified by a mobile country code (MCC) and a mobile network code (MNC). In particular, in the identification of the SNPN, i.e., a non-public network, a network identity (ID) for identifying the individual network may be used in addition to the MCC and the MNC.

The cell's PLMN information may be included in system information (e.g., system information block (SIB)) and broadcast.

In operation 241, the UE may select a network considering such information as, e.g., whether the SNPN supports PWS, the identifier (SNPN-ID) for identifying the network of the SNPN, and emergency support (EM) indication as to whether the SNPN supports emergency call.

The UE 101 may search for available networks and may select an appropriate network to be served by. The NAS layer of the UE 101 may inform the AS layer that selection of a network is required. The AS layer may search the corresponding band and provide the searched network list to the NAS layer.

The NAS layer of the UE 101 may select a network for registering the UE 101 according to the priority of PLMN/radio access technology (RAT) selection stored in the user services identity module (USIM).

The UE 101 may search for regular cells (suitable cells) among cells to which the network to be registered is to belong and select a cell that may provide an appropriate service. According to an embodiment of the disclosure, the regular cell may mean a cell where the UE 101 may receive a regular service. The regular cell should be a cell that is an acceptable cell, should belong to the network accessible by the UE 101, and is not barred from performing a registration procedure by the UE 101. Further, when the regular cell is a closed access group (CAG) cell, the UE 101 may be a CAG member, and the regular cell should be a cell that may be accessed by the UE 101.

Meanwhile, a cell to which the UE 101 may be provided with a limited service may be referred to as an acceptable cell. The acceptable cell may mean a cell that is not barred from camping on the acceptable cell by the UE 101 and meets the cell selection criterion of the UE 101. In other words, the acceptable cell may be a cell which meets signal strength or signal quality. When the UE 101 receives a limited service may be the case where it receives a service related to emergency call, earthquake and tsunami warning system (ETWS), public warning system (PWS), and CMAS, and the above-described limited services may be provided from the acceptable cell.

The message transmitted in operation 251 may be an RRC message between the UE 101 and the 5G RAN 103-2. The NAS message of operation 261 is carried on the RRC message 251.

The NAS message of operation 261 may be transmitted from the UE 101 to the AMF 111-2, in a section between the UE 101 and the AMF 111-2.

In operation 251, the UE 101 may transmit an RRC connection setup complete message to the 5G RAN 103-2, and the UE 101 may switch to the RRC connection mode.

A registration request message, which is a kind of NAS message, may be carried on the RRC message (e.g., RRC connection setup complete message) transmitted in operation 251, or the registration request message, which is a kind of NAS message, may be included in the RRC message, or the registration request message, which is a kind of NAS message, may be piggy-backed or concatenated to the RRC message.

In operations 261 and 263, the UE 101 may perform a registration procedure to the 5G network through the 5G NG-RAN 103-2 and the AMF 111-2 present in the SNPN. Thus, the UE 101 may be registered with the AMF 111-2 of the 5G network.

In operation 261, the UE 101 transmits a registration request message to the AMF 111-2.

The registration request message transmitted in operation 261 may include information, such as PWS priority indication and UE-SNPN-version. The PWS priority indication information is an indicator indicating that the UE 101 wants to connect, with priority, to a network supporting PWS. The UE-SNPN version information is information for informing the network that the UE 101 is a UE supporting PWS in relation to SNPN. The existing UE (e.g., 3GPP release 16 UE, or 3GPP release 15 UE) may not support PWS in SNPN. Accordingly, the UE 101 may inform the network that the UE 101 is a UE supporting PWS in relation to SNPN through UE-SNPN version information. The registration request message transmitted in operation 261 may include an SNPN indication. The SNPN indication included in the registration request message may be an indication for requesting that the UE 101 receive an emergency call service from the SNPN. In an embodiment, the SNPN indication may be used together with information (emergency call indication) for requesting an emergency call service to be used for the purpose of informing the network that the UE 101 requests an emergency call service from the SNPN.

As another example, the registration request message of operation 261 may include information indicating whether to support an emergency call, information to request support of an emergency call, or an EM indication indicating whether to support an emergency call.

Thereafter, in operation 263, the AMF 111-2 transmits a registration accept message to the UE 101 when the registration of the UE 101 is accepted. In particular, when the AMF 111-2 supports an emergency call within the SNPN of the UE 101, the AMF 111-2 may include the emergency call number supported by the SNPN in the registration accept message and transmit it.

After operation 263, the UE 101 receiving the registration accept message may operate in various schemes as shown in the following examples.

- The UE 101 deletes the previously received emergency call number and stores a new emergency call number received through the registration accept message.
- The UE 101 updates the emergency call number with the new emergency call number received through the registration accept message and saves it.
- The UE 101 stores the new emergency call number received through the registration accept message while maintaining the previously received emergency call number.
- The information about the emergency call number may be updated, stored, or managed through a separate information element (separate parameter) called the SNPN emergency call number, extended emergency call number, emergency call number, country code, or MCC. Here, the extended emergency call number refers to the emergency call number used in SNPN.

When the UE 101 is in the SNPN, it may perform an emergency call, such as mapping the number suitable for the emergency input by the user to the emergency call number supported by its SNPN (i.e., a correct number supporting emergency call) and calling or texting, using the stored emergency call number.

The registration accept message may include at least one of the following various information.

(1) For example, when the MCC information is "9xx", that is, when the first digit starts with "9", it may indicate that the MCC is an international code, i.e., an international area.

In this case, emergency call number information for emergency call, such as extended emergency call number (or referred to as extended emergency number or EX EM number), along with the emergency call number (or referred to as emergency number or EM number), may be transmitted.

(2) Information for indicating that emergency call is accessible (e.g., accessible EM parameter) or for indicating that it is an emergency call in the SNPN may be transmitted. In other words, information about whether the SNPN may support an emergency call service, or information indicating that it is an emergency call supported by the SNPN, i.e., non-public network, may be transmitted.

(3) SNPN indication or SNPN-related information or information indicating the emergency call may be transmitted to indicate that the network may receive the emergency call in the SNPN through the information indicating the emergency call and the SNPN indication. The SNPN indication included in the registration accept message, transmitted in operation 263, may be an indication that the SNPN supports an emergency call service.

Or, the SNPN indication provided by the AMF 111-2 may be an identifier for indicating that a service is provided through the SNPN and be used together with the emergency call information (emergency call indication or EM indication) and emergency call number to be used for the purpose of allowing the AMF 111-2 to inform the UE 101 that the SNPN supports the emergency call service.

(4) When an emergency call is rendered possible in an international area through the extended emergency call number, valid indication information for indicating that the extended emergency call number is valid may be transmitted.

(5) When an emergency call is rendered possible (in a non-international area) through the extended emergency call number, valid indication information for indicating that the extended emergency call number is valid may be transmitted.

(6) Information for indicating the emergency type, e.g., fire or storm, may be transmitted.

(7) When the SNPN performs an emergency call, country-related information country information may be transmitted for the case where emergency call-related country information may not be known because specific country information is not known due to the MCC code starting with 9xx.

(8) When an emergency call is performed by the SNPN, country-related information country information may be transmitted together for the case where emergency call-related country information is not known (regardless of the country information indicated by the MCC code).

Described below is a method in which the UE 101 provides an emergency call service with the information elements received through a registration accept message after transmitting a registration request message in operation 261 and receiving the registration accept message in operation 263.

Case 1) Classification according to the method for receiving the emergency call number Case 1-1) When explicitly receiving the SNPN emergency call number information element through the information element as an emergency call number If the UE 101 receives the registration accept message, the UE 101 may check whether the received registration accept message includes the SNPN emergency call number and, if the SNPN emergency call number is included, perform an emergency call service by using the SNPN emergency call number as the emergency call number. For example, when the SNPN receives 112 or 119 as the SNPN emergency call number through the registration accept message, the UE 101 may perform an emergency call service based on 112 or 119 which is the received SNPN emergency call number.

Case 1-2) Method of processing with the SNPN call knowing that the network is the SNPN, while using the extended emergency call number as the emergency call number Case 1-2 may be largely classified into two methods, and the UE 101 and the AMF 111-2 may have the following features so that the UE 101 and network may also process it.

Case 1-2-1) First method of processing with the SNPN call knowing that the network is the SNPN, while using the extended emergency call number as the emergency call number When the MCC is the SNPN or international area through the registration accept message, e.g., when receiving the SNPN identifier or SNPN indication starting "90x" or "999," the UE 101 may operate as follows.

The UE 101 extracts the emergency call number from the extended emergency call number information element included in the registration accept message and uses it.

In this case, the UE 101 may be aware that the extended emergency call number is valid through the indicator or validity indication that it is valid only for the PLMN or SNPN receiving the extended emergency call number and use it, and the extended emergency call number may be valid in the PLMN or SNPN receiving it.

In this case, when the country of the SNPN registered by the UE 101 is changed, when the UE 101 moves from the SNPN of one country (e.g., from the SNPN located in a country where MCC code may be received) to the SNPN of an international area or when the UE 101 moves from the SNPN of the international area to the SNPN of one country (e.g., the SNPN located in a country where MCC code may be received), the UE 101 may delete the extended emergency call number that has previously been received and stored.

Case 1-2-2) Second method of processing with the SNPN call knowing that the network is the SNPN, while using the extended emergency call number as the emergency call number When the MCC is the SNPN or international area through the registration accept message, e.g., when receiving the SNPN identifier or SNPN indication starting "90x" or "999," the UE 101 may operate as follows.

The UE 101 extracts the emergency call number from the extended emergency call number information element included in the registration accept message and uses it.

In this case, the UE 101 may be aware that the extended emergency call number is valid through the indicator or validity indication that it is valid only for the PLMN or SNPN receiving the extended emergency call number and use it.

In an embodiment, the registration accept message may include a parameter indicating whether the extended emergency call number is valid, i.e., the extended emergency call number validity.

When this parameter is included in the registration accept message, the UE 101 may recognize that the information is valid in the PLMN that has received the extended emergency call number.

Case 1-2-2-1) The UE 101 may determine that it is valid, e.g., when the network receiving the extended emergency call number list and the network with which the UE 101 is to currently communicate are in the same country (e.g., the same MCC).

Case 1-2-2-2) The UE 101 may determine that the network receiving the emergency call number list may use the extended emergency call number list.

Case 1-2-2-3) For example, if the case of receiving the extended emergency call number list corresponds to the SNPN, the UE 101 may determine that the extended emergency call number is valid regardless of the value of the validity indication of the extended emergency call number and use it.

Case 1-3) Method of processing an SNPN call using the emergency call number

The UE 101 may process the SNPN call using the emergency call number included in the registration accept message.

Case 2) Classification according to the method of recognizing information about the country where an emergency call has been made (in the case of the international area)

For example, the case where the MCC code starts with "90x", e.g., "90" is when the UE 101 exists in the international area. As another example, the case where the MCC code is "999" may be when the UE 101 exists in the SNPN. In this case, since receiving the SNPN identifier is when the network is the SNPN or the SNPN is in the international area, it may be difficult to precisely know the country where the SNPN belongs.

Case 2-1) The UE 101 may perform the following operations to identify the country information in the registration accept message and obtain information about the area where the emergency call has been made.

For example, the UE 101 may use information about the network accessed or registered by the SNPN based on the country information included in the registration accept message. Such a case is when the UE 101 accesses, e.g., the international area.

Therefore, in such a case, the country information may include an indication or bit information indicating whether the SNPN belongs to a specific country or belongs to the international area.

Case 2-2) Upon receiving a 5G-globally unique temporary identifier (GUTI) from the SNPN network, the UE 101 may identify the MCC code of the 5GP GUTI part.

Since the network accessed by the UE 101 and country information may be known through the MCC information in the 5G-GUTI, the emergency call number or extended emergency call number for the country may be used. Such a case is when the SNPN belongs to one country so that the MCC information may be extracted through the SNPN.

Case 2-3) The UE 101 may extract MCC from the SNPN identifier of the SNPN.

Since the UE 101 may know the network accessed by the UE 101 and country information by extracting the MCC, the UE 101 may use the emergency call number or extended emergency call number for the country.

Case 3) Classification according to the method of knowing information about the country where an emergency call has been made (in the case where it is over two countries)

When the SNPN is over two adjacent countries (e.g., when identical or similar to the environment shown in FIG. 1B) or when the connected SNPN is changed (e.g., when identical or similar to the environment shown in FIG. 1C), the UE 101 may operate as follows.

Figure 3:
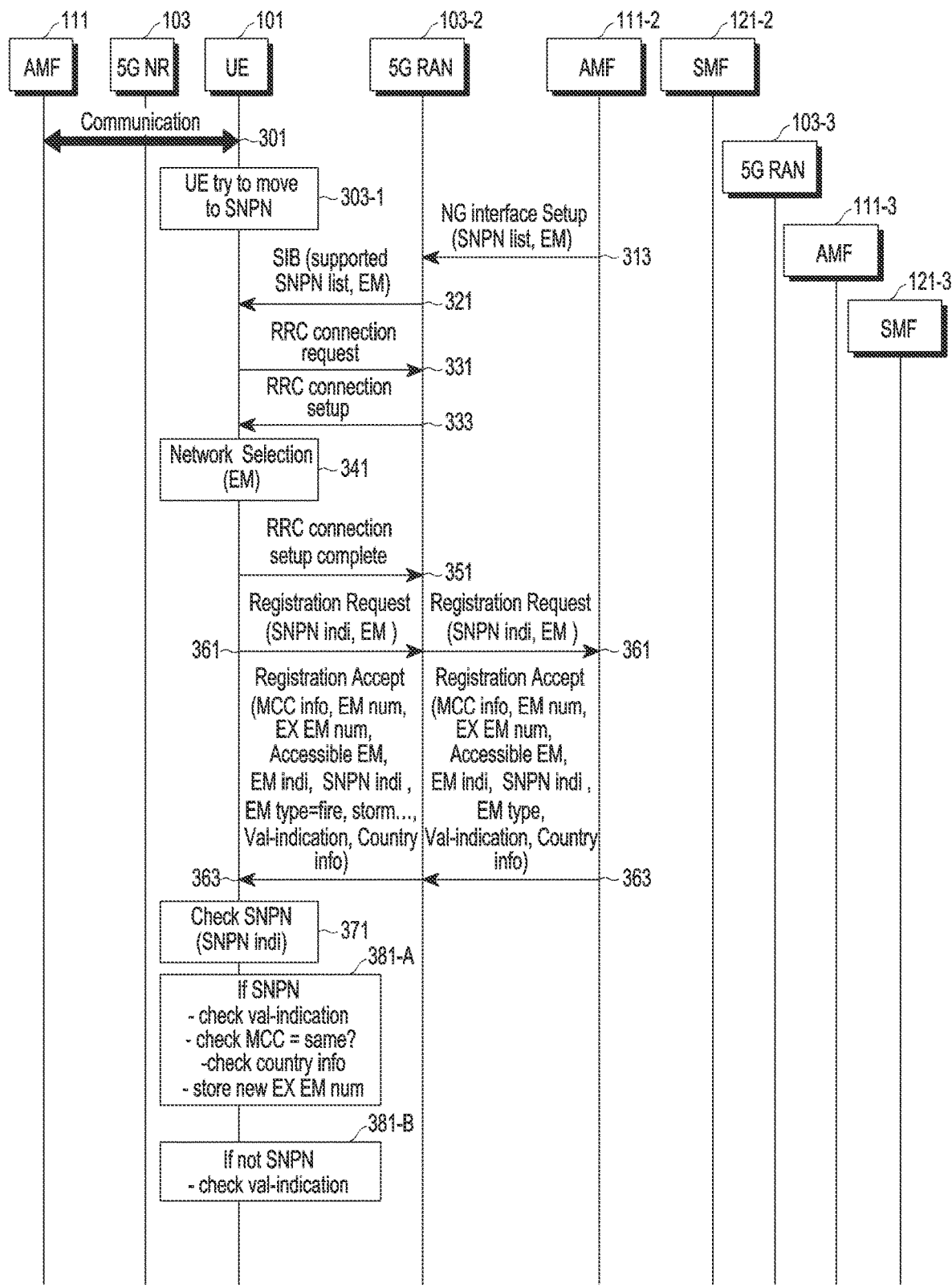
FIG. 3 is a signal flowchart schematically illustrating a procedure for providing an emergency call service in a wireless communication network according to an embodiment of the disclosure.

Case 3-1) For example, when the SNPN network is over two countries as shown in FIG. 1B, the UE 101 may operate as shown in FIG. 3.

Figure 4:
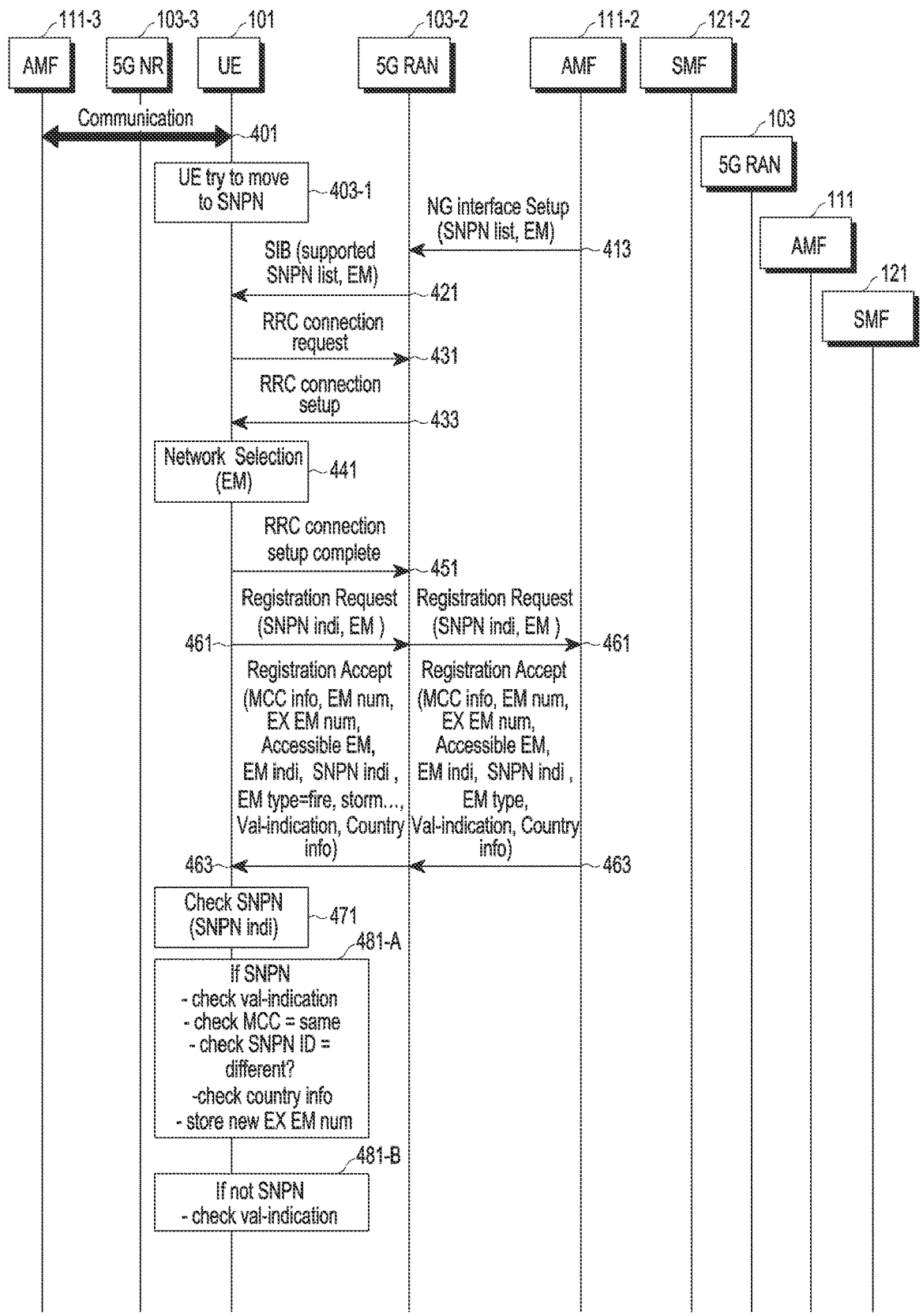
FIG. 4 is a signal flowchart schematically illustrating a procedure for providing an emergency call service in a wireless communication network according to an embodiment of the disclosure.

Case 3-2) For example, when the SNPN network is changed as shown in FIG. 1C, the UE 101 may operate as shown in FIG. 4.

Case 4) Classification according to the method of knowing whether the UE is connected to SNPN A method for knowing that a message is received from the SNPN when the UE 101 receives a registration accept message is described below.

Case 4-1) The UE 101 may know that it is connected to the SNPN through the SNPN identifier. For example, if the UE 101 has connected to the SNPN network when receiving a registration accept message, it may receive an SNPN identifier where the PLMN identifier (e.g., MCC and MNC) and the network identity (NID) have been concatenated, so that it may be known that the UE 101 has connected to the SNPN.

Case 4-2) When the MCC (country code) of the PLMN identifier is, e.g., "999," it is an SNPN, so that the UE 101 may know that the UE 101 has connected to the SNPN therethrough.

Case 4-3) If the SNPN indicator information element (parameter) is included in the registration accept message, the UE 101 may also know through this. This may be used when the SNPN indicator is explicitly included in the registration accept message.

A method in which the UE 101 provides an emergency call service with the information elements received through a registration accept message after transmitting a registration request message in operation 261 of FIG. 2 and receiving the registration accept message in operation 263 has been described case-by-case for various operations, but at least two of the cases may be combined and used.

In operation 271, the UE 101 receiving the registration accept message may check whether the connected network is the SNPN or whether the SNPN indication is included, based on the received registration accept message. As such, the UE 101 may perform an emergency call in the non-public network based on identifying whether the SNPN indication is included. For example, when the SNPN indication is included, it may be determined to perform an emergency call in the non-public network and, when the SNPN indication is not included, it may be determined not to perform an emergency call in the non-public network.

If the UE 101 connects to the SNPN, in operation 281-A, the UE 101 may check whether there is a valid indication or, if receiving the extended emergency call number, whether the corresponding information is valid.

Further, the UE 101 may check whether the MCC is international, i.e., whether the MCC code is, e.g., "9xx" starting with 9. For example, the case where the MCC code starts with "90x", e.g., "90" is when the UE 101 exists in the international area. As another example, when the MCC code is "999", it may indicate that the network is SNPN.

If the MCC starts with 9, the UE 101 may check whether there is country information. For example, when country information is included in the registration accept message, the country information included in the registration accept message may be stored. Or, when the country information is included in the registration accept message, the country information included in the registration accept message may be a reference for determining what country of emergency call number should be used so as to secure a list of numbers for emergency calls (emergency call numbers). For example, the emergency call number list provided in the corresponding country/area may be received by referring to the country information.

The UE 101 may store the corresponding information when the new extended emergency call number or SNPN emergency call number is included.

In an embodiment, whether the SNPN indication is included, whether there is a valid indication, whether the MCC code is international or is, e.g., 9xx starting with 9, and whether there is an SNPN emergency call number may be simultaneously checked or only some may be checked or reviewed in combination.

If the UE 101 does not connect to the SNPN (e.g., when the registration accept message lacks SNPN-related information) or the valid indication check fails, it may be determined that the corresponding SNPN does not perform an emergency call and, in operation 281-B, the UE 101 may not store the received emergency call number or extended emergency call number.

FIG. 3 is a signal flowchart schematically illustrating a procedure for providing an emergency call service in a wireless communication network according to an embodiment of the disclosure.

The procedure for providing an emergency call service shown in FIG. 3 may be a procedure for supporting an emergency call in a wireless communication network environment when the SNPN is located in adjacent areas of two countries.

The procedure for providing an emergency call service shown in FIG. 3 may be a procedure for supporting an emergency call service in an environment in which a general communication PLMN and an SNPN, i.e., a non-public network, coexist in a wireless communication network (e.g., a 5G network). The procedure for providing an emergency call service illustrated in FIG. 3 may be a procedure for providing an emergency call service in the wireless communication network environment described with reference to FIG. 1B.

FIG. 3 is a signal flowchart illustrating a procedure for efficiently transferring various messages, such as a public warning system (PWS) message, a commercial mobile alert system (CMAS) message, or disaster text warning system (earthquake and tsunami warning system (ETWS)), such as for a fire, an earthquake, tsunami, heavy rain, storm, heavy snow, or disease, emergency disaster messages, in an environment where a general 5G communication network and a non-public network coexist according to an embodiment of the disclosure.

The signal flowchart for providing an emergency call as shown in FIG. 3 may be a signal flowchart for providing an emergency call that may be used by the AMF or 5G NG-RAN present in the non-public network, rather than the AMF or 5G NG-RAN present in the 3GPP operator network, i.e., general public network.

As described in connection with FIG. 1B, SNPN-A may support both PWS and emergency call and may include an AMF 111-2 and an SNPN access 103-2, i.e., a 5G NR base station. In this case, the disaster message may be transferred through the path of the CBE 191, the CBCF 181, the AMF 111-2 of SNPN-A, and the 5G NG-RAN 103-2 of SNPN-A.

The 5G RAN may broadcast the received CBS message to the UE existing in the 5G RAN cell.

Meanwhile, in the wireless communication network environment of FIG. 1B, the following various examples may be implemented depending on whether SNPN may directly support PWS, CMAS, and emergency call services.

SNPN-A is an SNPN that may support services, such as PWS, CMAS, and emergency call.

As another example,

SNPN-B is an SNPN that does not directly support services, such as PWS, CMAS, and emergency call.

SNPN-A or SNPN-B is an SNPN that supports PWS but does not support emergency call.

SNPN-A or SNPN-B is an SNPN that supports emergency call, but does not support PWS.

In the disclosure, various embodiments as follows are possible according to the shape of the radio RAN section supported by the SNPN in FIG. 1B.

The access network section of SNPN may be 5G RAN, that is, NG RAN.

The access network section of the SNPN may be a non-3GPP access network.

In operation 301, the UE 101 is performing communication in the communication carrier's public network, i.e., a general public PLMN.

In operation 303-1, the UE 101 attempts to move to a standalone non-public network corresponding to a private network while performing communication in the communication carrier's general public network.

Described below is an operation in which the UE 101 moves from the public network to a non-public network which has an agreement with the communication carrier to which the UE 101 subscribes, or a non-public network allowing access or registration of the UE 101 to receive a service.

In operation 313, the AMF 111-2 of SNPN-A may previously provide the 5G RAN 103-2 with at least one of pieces of information, such as SNPN list, indication as to whether PWS is supported, or PWS support-related information, and emergency support (EM) indication as to whether emergency call is supported, through NG interface setup. In an embodiment, the SNPN list may include information related to SNPNs supportable by the AMF 111-2. For example, the SNPN list may include identifiers of SNPNs where the AMF 111-2 may provide a service to the UE 101. In an embodiment, the SNPN list may include list information about identifiers (SNPN-IDs) for identifying SNPNs, or SNPN identifier information.

For example, operation 313 may be performed in the process of setting up the SNPN before evaluating and determining whether to support the emergency call service for the UE 101.

In operation 321, the 5G RAN 103-2 receiving the SNPN list and PWS-related information from the AMF 111-2 may transmit the SNPN list supported by the corresponding SNPN, e.g., SNPN-A, PWS-related information, and information about whether emergency call is supported, through a SIB, to the UE 101. In an embodiment, the SNPN list may include information related to SNPNs supportable by the AMF 111-2. For example, the SNPN list may include identifiers of SNPNs where the AMF 111-2 may provide a service to the UE 101. In an embodiment, the SNPN list may include list information about identifiers (SNPN-IDs) for identifying SNPNs, or SNPN identifier information.

Referring to operation 331, the UE 101 may an RRC connection request message to the 5G RAN 103-2. In operation 331, the UE 101 in the idle state may attempt an RRC connection with the 5G RAN 103-2 to attempt a call, attempt data transmission, or respond to paging.

In operation 333, the UE 101 may receive an RRC connection setup message that is a response message to the RRC connection request message from the 5G RAN 103-2. For example, when the 5G RAN 103-2 accepts the RRC connection request of the UE 101, the UE 101 may receive an RRC connection setup message from the 5G RAN 103-2. The 5G RAN 103-2 of SNPN-A may transmit an RRC connection setup message to the UE 101 attempting to access the 5G network.

In operation 341, the UE 101 may perform the following process in relation to selection of a network (e.g., PLMN or SNPN) to request for registration. As an example, the PLMN may be identified with an MCC and an MNC. In particular, in the identification of the SNPN, i.e., a non-public network, a network ID for identifying the individual network may be used in addition to the MCC and the MNC.

The cell's PLMN information may be included in system information (e.g., SIB) and broadcast.

In operation 341, the UE 101 may select a PLMN considering such information as, e.g., whether the SNPN supports PWS, the identifier (SNPN-ID) for identifying the network of the SNPN, and emergency support (EM) indication as to whether the SNPN supports emergency call.

The UE 101 may search for available networks and may select an appropriate network to be served by. The NAS layer of the UE 101 may inform the AS layer that selection of a network is required. The AS layer may search the corresponding band and provide the searched network list to the NAS layer.

The NAS layer of the UE 101 may select a network for registering the UE 101 according to the priority of PLMN/RAT selection stored in the USIM.

The UE 101 may search for regular cells (suitable cells) among cells to which the network to be registered is to belong and select a cell that may provide an appropriate service. According to an embodiment of the disclosure, the regular cell may mean a cell where the UE 101 may receive a regular service. The cell should be a cell that is an acceptable cell, should belong to the network accessible by the UE 101, and is not barred from performing a registration procedure by the UE 101. Further, when the regular cell is a closed access group (CAG) cell, the UE 101 may be a CAG member, and the regular cell should be a cell that may be accessed by the UE 101.

Meanwhile, a cell to which the UE 101 may be provided with a limited service may be referred to as an acceptable cell. The acceptable cell may mean a cell that is not barred from camping on the acceptable cell by the UE 101 and meets the cell selection criterion of the UE 101. In other words, the acceptable cell may be a cell which meets signal strength or signal quality. When the UE 101 receives a limited service may be the case where it receives a service related to emergency call, earthquake and tsunami warning system (ETWS), PWS, and CMAS, and the above-described limited services may be provided from the acceptable cell.

The message transmitted in operation 351 may be an RRC message between the UE 101 and the 5G RAN 103-2. The NAS message of operation 361 is carried on the RRC message 351.

The NAS message of operation 361 may be transmitted from the UE 101 to the AMF 111-2, in a section between the UE 101 and the AMF 111-2.

In operation 351, the UE 101 may transmit an RRC connection setup complete message to the 5G RAN 103-2, and the UE 101 may switch to the RRC connection mode.

A registration request message, which is a kind of NAS message, may be carried on the RRC message (e.g., RRC connection setup complete message) transmitted in operation 351, or the registration request message, which is a kind of NAS message, may be included in the RRC message, or the registration request message, which is a kind of NAS message, may be piggy-backed or concatenated to the RRC message.

In operations 361 and 363, the UE 101 may perform a registration procedure to the 5G network through the 5G NG-RAN 103-2 and the AMF 111-2 present in the SNPN. Thus, the UE 101 may be registered with the AMF 111-2 of the 5G network.

In operation 361, the UE 101 transmits a registration request message to the AMF 111-2.

The registration request message transmitted in operation 361 may include information, such as PWS priority indication and UE-SNPN-version. The PWS priority indication information is an indicator indicating that the UE 101 wants to connect, with priority, to a network supporting PWS. The UE-SNPN version information is information for informing the network that the UE 101 is a UE supporting PWS in relation to SNPN. The existing UE (e.g., 3GPP release 16 UE, or 3GPP release 15 UE) may not support PWS in SNPN. Accordingly, the UE 101 may inform the network that the UE 101 is a UE supporting PWS in relation to SNPN through UE-SNPN version information. The registration request message transmitted in operation 361 may include an SNPN indication. The SNPN indication included in the registration request message may be an indication for requesting that the UE 101 receive an emergency call service from the SNPN. In an embodiment, the SNPN indication may be used together with information (emergency call indication) for requesting an emergency call service to be used for the purpose of informing the network that the UE 101 requests an emergency call service from the SNPN.

As another example, the registration request message of operation 361 may include information indicating whether to support an emergency call, information to request support of an emergency call, or an EM indication indicating whether to support an emergency call.

Thereafter, in operation 363, the AMF 111-2 transmits a registration accept message to the UE 101 when the registration of the UE 101 is accepted. In particular, when the AMF 111-2 supports an emergency call within the SNPN of the UE 101, the AMF 111-2 may include the emergency call number supported by the SNPN in the registration accept message and transmit it.

After operation 363, the UE 101 receiving the registration accept message may operate in various schemes as follows.

The UE 101 deletes the previously received emergency call number and stores the received new emergency call number.

The UE 101 updates the emergency call number with the new emergency call number received and saves it.

The UE 101 maintains the previously received emergency call number and stores the received new emergency call number.

The information about the emergency call number may be updated, stored, or managed through a separate information element (separate parameter) called the SNPN emergency call number, extended emergency call number, emergency call number, country code, or MCC received by the UE from the AMF.

When the UE 101 is in the SNPN, it may perform an emergency call, such as mapping the number suitable for the emergency input by the user to the emergency call number supported by its SNPN (i.e., a correct number supporting emergency call) and calling or texting, using the stored emergency call number.

The registration accept message may include at least one of the following various information.

(1) In particular, when the MCC information is "9xx", that is, when the first digit starts with "9", it may indicate that the MCC is an international code, i.e., an international area.

In particular, when located in the adjacent area of two countries, according to an embodiment, the MCC information may be transmitted as an MCC for both the countries, or the MCC information may be transmitted as an MCC for any one country. In the case of the SNPN, when the MCC information is transmitted, the UE 101 may process with the country information, rather than receiving and processing number information for the emergency call or extended emergency call number with the MCC information by the SNPN indication. Or, according to an embodiment, the UE 101 may receive and store the number for emergency call with the MCC information and the extended emergency call number.

In this case, emergency call number information for emergency call, such as extended emergency call number or SNPN emergency call number, together with the emergency call number, may be transmitted.

(2) Information for indicating that emergency call is accessible (e.g., accessible EM parameter) or for indicating that it is an emergency call in the SNPN may be transmitted. For example, information about whether the SNPN may support an emergency call service, or information indicating that it is an emergency call supported by the SNPN, i.e., non-public network, may be transmitted.

(3) SNPN indication or SNPN-related information or information indicating the emergency call may be transmitted to indicate that the network may receive the emergency call in the SNPN through the information indicating the emergency call and the SNPN indication. The SNPN indication included in the registration accept message, transmitted in operation 363, may be an indication that the SNPN supports an emergency call service.

Or, the SNPN indication provided by the AMF 111-2 may be an identifier for indicating that a service is provided through the SNPN and be used together with the emergency call information (emergency call indication or EM indication) and emergency call number to be used for the purpose of allowing the AMF 111-2 to inform the UE 101 that the SNPN supports the emergency call service.

(4) When an emergency call is rendered possible in an international area through the extended emergency call number, valid indication information for indicating that the extended emergency call number is valid may be transmitted.

(5) When an emergency call is rendered possible (in a non-international area) through the extended emergency call number, valid indication information for indicating that the extended emergency call number is valid may be transmitted.

(6) Information for indicating the emergency type, e.g., fire or storm, may be transmitted.

(7) When the SNPN performs an emergency call, country-related information country information may be transmitted for the case where emergency call-related country information may not be known because specific country information is not known due to the MCC code starting with 9xx.

(8) When an emergency call is performed by the SNPN, country-related information country information may be transmitted together for the case where emergency call-related country information is not known (regardless of the country information indicated by the MCC code).

Accordingly, the method in which the UE 101 transmits a registration request message in operation 361 and, in operation 363, the UE 101 receives the registration accept message and then provides an emergency call service with the information elements received through the registration accept message may be implemented in the same or similar manner to the method in which the UE 101 transmits a registration request message in operation 261, and the UE 101 provides an emergency call service with the information elements received through the registration accept message as shown in FIG. 2, and no detailed description thereof is given below.

In operation 371, the UE 101 receiving the registration accept message may check whether the connected network is the SNPN or whether the SNPN indication is included, based on the received registration accept message. As such, the UE 101 may perform an emergency call in the non-public network based on identifying whether the SNPN indication is included. For example, when the SNPN indication is included, it may be determined to perform an emergency call in the non-public network and, when the SNPN indication is not included, it may be determined not to perform an emergency call in the non-public network.

If the UE 101 connects to the SNPN, in operation 381-A, the UE 101 may check whether there is a valid indication or, if receiving the extended emergency call number, whether the corresponding information is valid.

Further, the UE 101 may check whether the MCC is international, i.e., whether the MCC code is, e.g., "9xx" starting with 9.

Further, the UE 101 may check whether the MCC included in the registration accept message is the same as the country code of the code part of the SNPN ID. If the country code of the code part of the SNPN ID differs from the MCC, the UE may determine that it has connected to the network of a country different from the previously connected country.

If it is determined that the UE is connected to the existing network rather than moving to the network of another country, the UE may not store the new emergency call number information. Or, the UE may not update the existing emergency call number list or extended emergency call number list with the new emergency call number. Or, the UE may not add the new emergency call number to the existing emergency call number list or extended emergency call number list.

Further, the UE 101 may check whether the registration accept message includes, e.g., country information. For example, when country information is included in the registration accept message, the UE 101 may store the country information included in the registration accept message.

If there is a new extended emergency call number or SNPN emergency call number, the UE 101 stores the corresponding information.

In an embodiment, whether the SNPN indication is included, whether there is a valid indication, whether the MCC code is international or is, e.g., 9xx starting with 9, whether the MCC is the same as the country code of the SNPN ID, and whether there is an SNPN emergency call number may be simultaneously checked or only some may be checked or reviewed in combination.

If the UE 101 does not connect to the SNPN (e.g., when the registration accept message lacks SNPN-related information) or the valid indication check fails, it may be determined that the corresponding SNPN does not perform an emergency call and, in operation 381-B, the UE 101 may not store the emergency call number or extended emergency call number.

FIG. 4 is a signal flowchart schematically illustrating a procedure for providing an emergency call service in a wireless communication network according to an embodiment of the disclosure.

The procedure for providing an emergency call service shown in FIG. 4 may be a procedure for supporting an emergency call service in a wireless communication network environment when moving from one SNPN to another SNPN.

The procedure for providing an emergency call service shown in FIG. 4 may be a procedure for supporting an emergency call service in an environment in which a general communication PLMN and an SNPN, i.e., a non-public network, coexist in a wireless communication network (e.g., a 5G network). The procedure for providing an emergency call service illustrated in FIG. 4 may be a procedure for providing an emergency call service in the wireless communication network environment described with reference to FIG. 1C.

Accordingly, FIG. 4 is a signal flowchart illustrating a procedure for efficiently transferring various messages, such as a public warning system (PWS) message, a commercial mobile alert system (CMAS) message, or disaster text warning system (earthquake and tsunami warning system (ETWS)), such as for a fire, an earthquake, tsunami, heavy rain, storm, heavy snow, or disease, emergency disaster messages, in an environment where a general 5G communication network and a non-public network coexist according to an embodiment of the disclosure.

The signal flowchart for providing an emergency call as shown in FIG. 4 may be a signal flowchart for providing an emergency call that may be used by the AMF or 5G NG-RAN present in the non-public network, rather than the AMF or 5G NG-RAN present in the 3GPP operator network, i.e., general public network.

As described in connection with FIG. 1C, SNPN-A may support both PWS and emergency call and may include an AMF 111-2 and an SNPN access 103-2, i.e., a 5G NR base station. In this case, the disaster message may be transferred through the path of the CBE 191, the CBCF 181, the AMF 111-2 of SNPN-A, and the 5G NG-RAN 103-2 of SNPN-A.

The 5G RAN may broadcast the received CBS message to the UE existing in the 5G RAN cell.

Meanwhile, in the wireless communication network environment of FIG. 1C, the following various examples (e.g., examples of Case 1) may be implemented depending on whether SNPN may directly support PWS, CMAS, and emergency call services.

SNPN-A is an SNPN that may support services, such as PWS, CMAS, and emergency call.

SNPN-B is an SNPN that does not directly support services, such as PWS, CMAS, and emergency call.

SNPN-A or SNPN-B is an SNPN that supports PWS but does not support emergency call.

SNPN-A or SNPN-B is an SNPN that supports emergency call, but does not support PWS.

In the disclosure, various embodiments as follows are possible according to the shape of the radio RAN section supported by the SNPN in FIG. 1C.

The access network section of SNPN may be 5G RAN, that is, NG RAN.

The access network section of the SNPN may be a non-3GPP access network.

In operation 401, the UE 101 is performing communication in the communication carrier's public network, i.e., a general public PLMN.

In operation 403-1, the UE 101 attempts to move to a standalone non-public network corresponding to a private network while performing communication in the communication carrier's general public network.

Described below is an operation in which the UE 101 moves from the public network to a non-public network which has an agreement with the communication carrier to which the UE 101 subscribes, or a non-public network allowing access or registration of the UE 101 to receive a service.

In operation 413, the AMF 111-2 of SNPN-A may previously provide the 5G RAN 103-2 with at least one of pieces of information, such as SNPN list, indication as to whether PWS is supported, or PWS support-related information, and emergency support (EM) indication as to whether emergency call is supported, through NG interface setup. In an embodiment, the SNPN list may include information related to SNPNs supportable by the AMF 111-2. For example, the SNPN list may include identifiers of SNPNs where the AMF 111-2 may provide a service to the UE 101. In an embodiment, the SNPN list may include list information about identifiers (SNPN-IDs) for identifying SNPNs, or SNPN identifier information.

For example, operation 413 may be performed in the process of setting up the SNPN before evaluating and determining whether to support the emergency call service for the UE 101.

In operation 421, the 5G RAN 103-2 receiving the SNPN list and PWS-related information from the AMF 111-2 may transmit the SNPN list supported by the corresponding SNPN, e.g., SNPN-A, PWS-related information, and information about whether emergency call is supported, through a SIB, to the UE 101. In an embodiment, the SNPN list may include information related to SNPNs supportable by the AMF 111-2. For example, the SNPN list may include identifiers of SNPNs where the AMF 111-2 may provide a service to the UE 101. In an embodiment, the SNPN list may include list information about identifiers (SNPN-IDs) for identifying SNPNs, or SNPN identifier information.

Referring to operation 431, the UE 101 may an RRC connection request message to the 5G RAN 103-2. In operation 431, the UE 101 in the idle state may attempt an RRC connection with the 5G RAN 103-2 to attempt a call, attempt data transmission, or respond to paging.

In operation 433, the UE 101 may receive an RRC connection setup message that is a response message to the RRC connection request message from the 5G RAN 103-2. For example, when the 5G RAN 103-2 accepts the RRC connection request of the UE 101, the UE 101 may receive an RRC connection setup message from the 5G RAN 103-2. The 5G RAN 103-2 of SNPN-A may transmit an RRC connection setup message to the UE 101 attempting to access the 5G network.

In operation 441, the UE 101 may perform the following process in relation to selection of a network (e.g., PLMN or SNPN) to request for registration. As an example, the PLMN may be identified with an MCC and an MNC. In particular, in the identification of the SNPN, i.e., a non-public network, a network ID for identifying the individual network may be used in addition to the MCC and the MNC.

The cell's PLMN information may be included in system information (e.g., system information block (SIB)) and broadcast.

In operation 441, the UE 101 may select a network considering such information as, e.g., whether the SNPN supports PWS, the identifier (SNPN-ID) for identifying the network of the SNPN, and emergency support (EM) indication as to whether the SNPN supports emergency call.

The UE 101 may search for available networks and may select an appropriate network to be served by. The NAS layer of the UE 101 may inform the AS layer that selection of a network is required. The AS layer may search the corresponding band and provide the searched network list to the NAS layer.

The NAS layer of the UE 101 may select a network for registering the UE 101 according to the priority of PLMN/RAT selection stored in the USIM.

The UE 101 may search for regular cells (suitable cells) among cells to which the network to be registered is to belong and select a cell that may provide an appropriate service. According to an embodiment of the disclosure, the regular cell may mean a cell where the UE 101 may receive a regular service. The cell should be a cell that is an acceptable cell, should belong to the network accessible by the UE 101, and is not barred from performing a registration procedure by the UE 101. Further, when the regular cell is a CAG cell, the UE 101 may be a CAG member, and the regular cell should be a cell that may be accessed by the UE 101.

Meanwhile, a cell to which the UE 101 may be provided with a limited service may be referred to as an acceptable cell. The acceptable cell may mean a cell that is not barred from camping on the acceptable cell by the UE 101 and meets the cell selection criterion of the UE 101. In other words, the acceptable cell may be a cell which meets signal strength or signal quality. When the UE 101 receives a limited service may be the case where it receives a service related to emergency call, earthquake and tsunami warning system (ETWS), PWS, and CMAS, and the above-described limited services may be provided from the acceptable cell.

The message transmitted in operation 451 may be an RRC message between the UE 101 and the 5G RAN 103-2. The NAS message of operation 461 is carried on the RRC message 451.

The NAS message of operation 461 may be transmitted from the UE 101 to the AMF 111-2, in a section between the UE 101 and the AMF 111-2.

In operation 451, the UE 101 may transmit an RRC connection setup complete message to the 5G RAN 103-2, and the UE 101 may switch to the RRC connection mode.

A registration request message, which is a kind of NAS message, may be carried on the RRC message (e.g., RRC connection setup complete message) transmitted in operation 451, or the registration request message, which is a kind of NAS message, may be included in the RRC message, or the registration request message, which is a kind of NAS message, may be piggy-backed or concatenated to the RRC message.

In operations 461 and 463, the UE 101 may perform a registration procedure to the 5G network through the 5G NG-RAN 103-2 and the AMF 111-2 present in the SNPN. Thus, the UE 101 may be registered with the AMF 111-2 of the 5G network.

In operation 461, the UE 101 transmits a registration request message to the AMF 111-2.

The registration request message transmitted in operation 461 may include information, such as PWS priority indication and UE-SNPN-version. The PWS priority indication information is an indicator indicating that the UE 101 wants to connect, with priority, to a network supporting PWS. The UE-SNPN version information is information for informing the network that the UE 101 is a UE supporting PWS in relation to SNPN. The existing UE (e.g., 3GPP release 16 UE, or 3GPP release 15 UE) may not support PWS in SNPN. Accordingly, the UE 101 may inform the network that the UE 101 is a UE supporting PWS in relation to SNPN through UE-SNPN version information. The registration request message transmitted in operation 461 may include an SNPN indication. The SNPN indication included in the registration request message may be an indication for requesting that the UE 101 receive an emergency call service from the SNPN. In an embodiment, the SNPN indication may be used together with information (emergency call indication) for requesting an emergency call service to be used for the purpose of informing the network that the UE 101 requests an emergency call service from the SNPN.

As another example, the registration request message of operation 461 may include information indicating whether to support an emergency call, information to request support of an emergency call, or an EM indication indicating whether to support an emergency call.

Thereafter, in operation 463, the AMF 111-2 transmits a registration accept message to the UE 101 when the registration of the UE 101 is accepted. In particular, when the AMF 111-2 supports an emergency call within the SNPN of the UE 101, the AMF 111-2 may include the emergency call number supported by the SNPN in the registration accept message and transmit it.

After operation 463, the UE 101 receiving the registration accept message may operate in various schemes as follows.

The UE 101 deletes the previously received emergency call number and stores the received new emergency call number.

The UE 101 updates the emergency call number with the new emergency call number received and saves it.

The UE 101 maintains the previously received emergency call number and stores the received new emergency call number.

When the UE 101 requests an emergency call service, and the UE 101 accesses the SNPN network, the information about the emergency call number may be updated, stored, or managed through a separate information element (separate parameter) called the SNPN emergency call number, extended emergency call number, emergency call number, country code, or MCC.

When the UE 101 exists in the SNPN, it may perform an emergency call, such as mapping the number suitable for the emergency input by the user to the emergency call number supported by its SNPN (i.e., a correct number supporting emergency call) and calling or texting, using the stored emergency call number.

The registration accept message may include at least one of the following various information.

(1) In particular, when the MCC information is "9xx", that is, when the first digit starts with "9", it may indicate that the MCC is an international code, i.e., an international area.

In this case, emergency call number information for emergency call, such as extended emergency call number or SNPN emergency call number, together with the emergency call number, may be transmitted.

(2) Information for indicating that emergency call is accessible (e.g., accessible EM parameter) or for indicating that it is an emergency call in the SNPN may be transmitted. For example, information about whether the SNPN may support an emergency call service, or information indicating that it is an emergency call supported by the SNPN, i.e., non-public network, may be transmitted.

(3) SNPN indication or SNPN-related information or information indicating the emergency call may be transmitted to indicate that the network may receive the emergency call in the SNPN through the information indicating the emergency call and the SNPN indication. The SNPN indication included in the registration accept message, transmitted in operation 463, may be an indication that the SNPN supports an emergency call service.

Or, the SNPN indication provided by the AMF 111-2 may be an identifier for indicating that a service is provided through the SNPN and be used together with the emergency call information (emergency call indication or EM indication) and emergency call number to be used for the purpose of allowing the AMF 111-2 to inform the UE 101 that the SNPN supports the emergency call service.

(4) When an emergency call is rendered possible in an international area through the extended emergency call number, valid indication information for indicating that the extended emergency call number is valid may be transmitted.

(5) When an emergency call is rendered possible (in a non-international area) through the extended emergency call number, valid indication information for indicating that the extended emergency call number is valid may be transmitted.

(6) Information for indicating the emergency type, e.g., fire or storm, may be transmitted.

(7) When the SNPN performs an emergency call, country-related information country information may be transmitted for the case where emergency call-related country information may not be known because specific country information is not known due to the MCC code starting with 9xx.

(8) When an emergency call is performed by the SNPN, country-related information country information may be transmitted together for the case where emergency call-related country information is not known (regardless of the country information indicated by the MCC code).

Accordingly, the method in which the UE 101 transmits a registration request message in operation 461 and, in operation 463, the UE 101 receives the registration accept message and then provides an emergency call service with the information elements received through the registration accept message may be implemented in the same or similar manner to the method in which the UE 101 transmits a registration request message in operation 261, and the UE 101 provides an emergency call service with the information elements received through the registration accept message as shown in FIG. 2, and no detailed description thereof is given below.

In operation 471, the UE 101 receiving the registration accept message checks whether the connected network is the SNPN or whether the SNPN indication is included, based on the received registration accept message. As such, the UE 101 may perform an emergency call in the non-public network based on identifying whether the SNPN indication is included. For example, when the SNPN indication is included, it may be determined to perform an emergency call in the non-public network and, when the SNPN indication is not included, it may be determined not to perform an emergency call in the non-public network.

If the UE 101 connects to the SNPN, in operation 481-A, the UE 101 may check whether there is a valid indication or, if receiving the extended emergency call number, whether the corresponding information is valid.

Further, the UE 101 may check whether the MCC is international, i.e., whether the MCC code is, e.g., "9xx" starting with 9.

Further, the UE 101 may check whether the MCC included in the registration accept message is the same as the country code of the code part of the SNPN ID.

Further, the UE 101 checks whether the registration accept message includes, e.g., country information. For example, when country information is included in the registration accept message, the UE 101 may store the country information included in the registration accept message.

Further, when the MCC code starts with "9xx," the UE 101 may check whether there is, e.g., country information.

Further, the UE 101 may check whether there is an SNPN indication and whether the SNPN identifier included in the registration accept message is the same as the existing SNPN identifier. If the SNPN identifier (e.g., the new SNPN identifier) included in the registration accept message differs from the existing SNPN identifier, the UE may determine that it has been connected with an SNPN different from the existing SNPN. If it is determined that the UE is connected to the existing SNPN rather than moving to another SNPN, the UE may not store the new emergency call number information. Or, the UE may not update the emergency call number list or extended emergency call number list with the new emergency call number. Or, the UE may not add the new emergency call number to the existing emergency call number list or extended emergency call number list.

If there is a new extended emergency call number or SNPN emergency call number, the UE 101 stores the corresponding information.

In an embodiment, whether the SNPN indication is included, whether there is a valid indication, whether the MCC code is international or is, e.g., 9xx starting with 9, whether the MCC is the same, whether there is an SNPN emergency call number, and whether the new SNPN identifier is the same as the existing SNPN identifier may be simultaneously checked or only some may be checked or reviewed in combination.

If the UE 101 does not connect to the SNPN (e.g., when the registration accept message lacks SNPN-related information) or the valid indication check fails, it may be determined that the corresponding SNPN does not perform an emergency call and, in operation 481-B, the UE 101 may not store the emergency call number or extended emergency call number.

Figure 5:
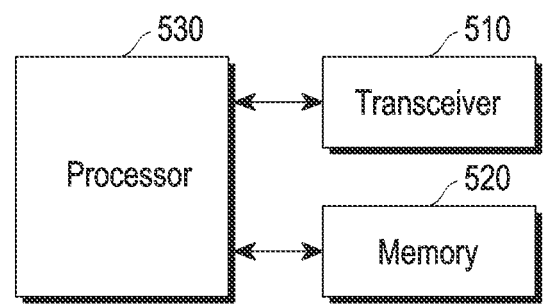
FIG. 5 is a view illustrating an example of an internal structure of a UE according to an embodiment of the disclosure.

FIG. 5 is a view illustrating an example of an internal structure of a UE according to an embodiment of the disclosure.

Referring to FIG. 5, a UE of the disclosure may include a transceiver 510, a memory 520, and a processor 530. The processor 530, transceiver 510, and memory 520 of the UE may be operated according to the above-described UE communication method. However, the components of the UE are not limited thereto. For example, the UE may include more or fewer components than the above-described components. The processor 530, the transceiver 510, and the memory 520 may be implemented in the form of a single chip.

The transceiver 510 collectively refers to the transmitter of the UE and the receiver of the UE and may transmit and receive signals to/from the base station or network entity. The signals transmitted/received with the base station may include control information and data. To that end, the transceiver 510 may include a radio frequency (RF) transmitter for frequency-up converting and amplifying signals transmitted and an RF receiver for low-noise amplifying signals received and frequency-down converting the frequency of the received signals. However, this is merely an example of the transceiver 510, and the components of the transceiver 510 are not limited to the RF transmitter and the RF receiver.

Further, the transceiver 510 may include a wired/wireless transceiver and may include various components for transmitting/receiving signals.

The transceiver 510 may receive signals via a radio channel, output the signals to the processor 530, and transmit signals output from the processor 530 via a radio channel.

Further, the transceiver 510 may receive the communication signal and output it to the processor and transmit the signal output from the processor to the network entity through the wired/wireless network.

The memory 520 may store programs and data necessary for the operation of the UE. The memory 520 may store control information or data that is included in the signal obtained by the UE. The memory 520 may include a storage medium, such as read-only memory (ROM), random access memory (RAM), hard disk, compact disc read only memory (CD-ROM), and digital versatile disc (DVD), or a combination of storage media.

The processor 530 may control a series of processes for the UE to be able to operate according to the above-described embodiments. The processor 530 may include at least one processor. For example, the processor 530 may include a communication processor (CP) that performs control for communication and an application processor (AP) that controls an upper layer, such as an application program.

Figure 6:
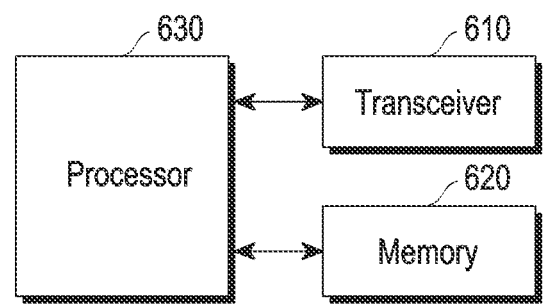
FIG. 6 is a view illustrating an example of an internal structure of a network entity according to an embodiment of the disclosure.

FIG. 6 is a view illustrating an example of an internal structure of a network entity according to an embodiment of the disclosure.

Referring to FIG. 6, a network entity of the disclosure may include a transceiver 610, a memory 620, and a processor 630. The processor 630, transceiver 610, and memory 620 of the network entity may operate according to the above-described communication methods by the network entity. However, the components of the network entity are not limited thereto. For example, the network entity may include more or fewer components than the above-described components. The processor 630, the transceiver 610, and the memory 620 may be implemented in the form of a single chip. The network entity may include network functions (NFs), such as the access and mobility management function (AMF), session management function (SMF), policy and charging function (PCF), network exposure function (NEF), unified data management (UDM), and user plane function (UPF), as described above. The network entity may include a base station.

The transceiver 610 collectively refers to the receiver of the network entity and the transmitter of the network entity and may transmit and receive signals to/from a UE or another network entity. In this case, the signals transmitted/received with the base station may include control information and data. To that end, the transceiver 610 may include a radio frequency (RF) transmitter for frequency-up converting and amplifying signals transmitted and an RF receiver for low-noise amplifying signals received and frequency-down converting the frequency of the received signals. However, this is merely an example of the transceiver 610, and the components of the transceiver 610 are not limited to the RF transmitter and the RF receiver. The transceiver 610 may include a wired/wireless transceiver and may include various components for transmitting/receiving signals.

Further, the transceiver 610 may receive signals via a communication channel (e.g., a radio channel), output the signals to the processor 630, and transmit signals output from the processor 630 via a radio channel.

Further, the transceiver 610 may receive the communication signal and output it to the processor and transmit the signal output from the processor to the UE or network entity through the wired/wireless network.

The memory 620 may store programs and data necessary for the operation of the network entity. Further, the memory 620 may store control information or data that is included in the signal obtained by the network entity. The memory 620 may include a storage medium, such as ROM, RAM, hard disk, CD-ROM, and DVD, or a combination of storage media.

The processor 630 may control a series of processes for the network entity to be able to operate according to the above-described embodiments. The processor 630 may include at least one processor. The methods according to the embodiments descried in the specification or claims of the disclosure may be implemented in hardware, software, or a combination of hardware and software.

When implemented in software, there may be provided a computer readable storage medium storing one or more programs (software modules). One or more programs stored in the computer readable storage medium are configured to be executed by one or more processors in an electronic device. One or more programs include instructions that enable the electronic device to execute methods according to the embodiments described in the specification or claims of the disclosure.

The programs (software modules or software) may be stored in random access memories, non-volatile memories including flash memories, read-only memories (ROMs), electrically erasable programmable read-only memories (EEPROMs), magnetic disc storage devices, compact-disc ROMs, digital versatile discs (DVDs), or other types of optical storage devices, or magnetic cassettes. Or, the programs may be stored in a memory constituted of a combination of all or some thereof. As each constituting memory, multiple ones may be included.

The programs may be stored in attachable storage devices that may be accessed via a communication network, such as the Internet, Intranet, local area network (LAN), wide area network (WAN), or storage area network (SAN) or a communication network configured of a combination thereof. The storage device may connect to the device that performs embodiments of the disclosure via an external port. A separate storage device over the communication network may be connected to the device that performs embodiments of the disclosure.

Figure 7:
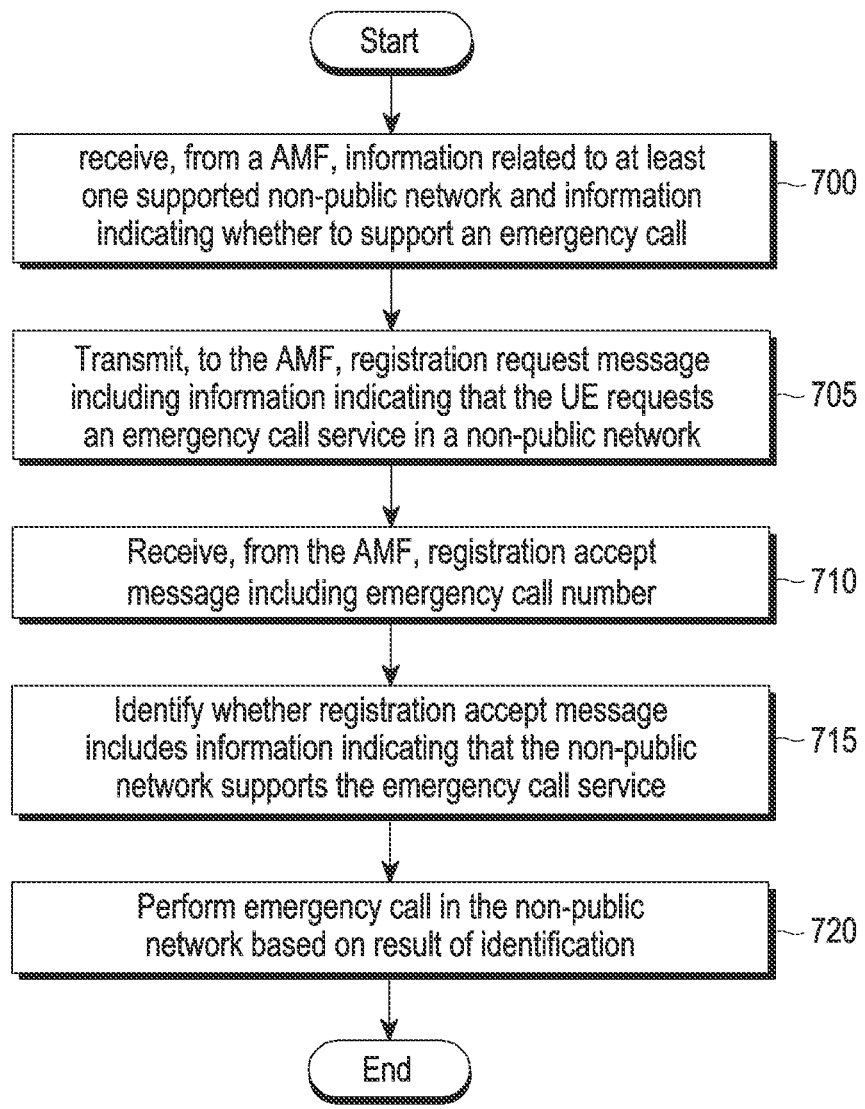
FIG. 7 is a view illustrating a method by a UE according to an embodiment of the disclosure.

FIG. 7 is a view illustrating a method by a UE according to an embodiment of the disclosure.

The methods by the UE performed in FIGS. 2 to 4 are described as an example in connection with FIG. 7.

The UE may receive from the AMF information related to at least one supported non-public network and information indicating whether the at least one supported non-public network supports an emergency call (operations 700, 213, 221, 313, 321, 413, and 421).

The UE may transmit to the AMF a registration request message including information indicating that an emergency call service is requested in a non-public network (operations 705, 261, 361, and 461).

The UE may receive a registration accept message including an emergency call number from the AMF (operations 710, 263, 363, and 463). The registration accept message may further include information indicating that an emergency call service is supported in the non-public network. The registration accept message may further include an extended emergency call number that is an emergency call number used in the non-public network. The registration accept message may further include information indicating whether the extended emergency call number is valid. The registration accept message may further include a mobile country code (MCC). In case that the MCC has a value starting with 9 or the UE registers with an SNPN located over two or more countries, the registration accept message may further include country information. The UE may obtain and store the emergency call number or the extended emergency call number using the country information. The UE may store the received emergency call number or extended emergency call number using the received (or obtained) emergency call number or extended emergency call number or update the existing information or add to the existing information and then store them or may delete the existing information and store the received information. The registration accept message may further include information indicating a type of emergency call.

The UE may identify whether the information indicating that the non-public network supports the emergency call service is included in the registration accept message (operations 715, 271, 371, and 471).

The UE may perform the emergency call in the non-public network based on the identification (operations 720, 281, 381, and 481). The emergency call may be performed using the emergency call number or the extended emergency call number.

Figure 8:
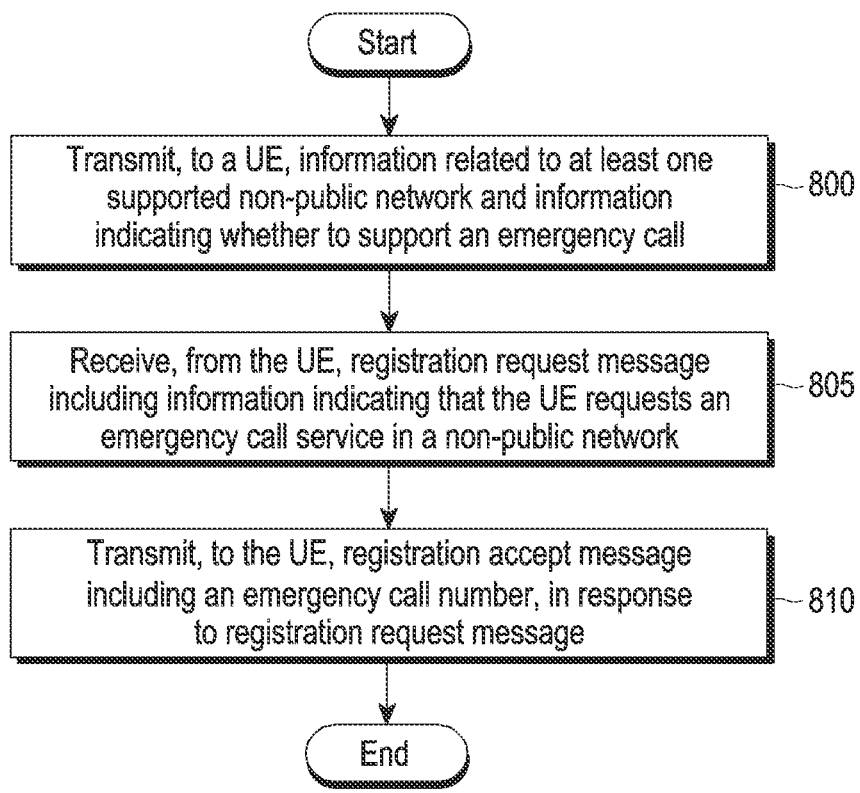
FIG. 8 is a view illustrating a method by an AMF according to an embodiment of the disclosure.

FIG. 8 is a view illustrating a method by an AMF according to an embodiment of the disclosure.

Referring to FIG. 8, the AMF may transmit to the user equipment (UE) information related to at least one supported non-public network and information indicating whether the at least one supported non-public network supports an emergency call (operations 800, 213, 221, 313, 321, 413, and 421). The information related to the supported non-public network and information indicating whether the at least one supported non-public network supports an emergency call may be transmitted from the AMF to the UE via the 5G RAN, i.e., in two steps (RRC message and NGAP message), that is, the information may be transmitted using a RRC connection between the UE and the 5G RAN and a NG application protocol (NGAP) UE association between the 5G RAN and AMF.

The AMF may receive, from the UE, a registration request message including information indicating that the UE requests an emergency call service in a non-public network (operations 805, 261, 361, and 461). The registration request message may be a NAS message.

The AMF may transmit a registration accept message including an emergency call number to the UE as a response to the registration request message (operations 810, 263, 363, and 463). The registration accept message may be a NAS message. The registration accept message may further include information indicating that an emergency call service is supported in the non-public network. The registration accept message may further include an extended emergency call number that is an emergency call number used in the non-public network. The registration accept message may further include information indicating whether the extended emergency call number is valid. The registration accept message may further include a mobile country code (MCC). In case that the MCC has a value starting with 9 or the UE registers with an SNPN located over two or more countries, the registration accept message may further include country information.

The registration accept message may further include information indicating a type of emergency call.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method by a user equipment (UE) configured to perform an emergency call in a non-public network, the method comprising:
    receiving, from an access and mobility management function (AMF), information related to at least one supported non-public network and information indicating whether the at least one supported non-public network supports the emergency call;
    transmitting, to the AMF, a registration request message including information indicating that the UE requests an emergency call service in the non-public network;
    receiving, from the AMF, a registration accept message including an emergency call number;
    identifying whether the registration accept message includes information indicating that the non-public network supports the emergency call service; and
    performing the emergency call in the non-public network based on a result of the identification,
    wherein the registration request message includes at least one of public warning system (PWS) priority indication information or UE-stand-alone non-public network (UE-SNPN) version information, and wherein the registration accept message includes at least one of emergency type or valid information indicating whether a call number is valid.

2. The method of claim 1,
wherein the registration accept message further includes an extended emergency call number used in the non-public network, and
wherein the emergency call is performed using the emergency call number or the extended emergency call number.

3. The method of claim 1,
wherein the registration accept message further includes a mobile country code (MCC), and
wherein, when the MCC has a value starting with 9, the registration accept message further includes country information.

4. The method of claim 3, further comprising:
storing or updating the emergency call number by using the country information.

5. A method performed by an access and mobility management function (AMF) in a non-public network, the method comprising:
transmitting, to a user equipment (UE), information related to at least one supported non-public network and information indicating whether the at least one supported non-public network supports an emergency call;
receiving, from the UE, a registration request message including information indicating that the UE requests an emergency call service in the non-public network; and
transmitting, to the UE, a registration accept message including an emergency call number in response to the registration request message,
wherein the registration request message includes at least one of public warning system (PWS) priority indication information or UE-stand-alone non-public network (UE-SNPN) version information, and
wherein the registration accept message includes at least one of emergency type or valid information indicating whether a call number is valid.

6. The method of claim 5, wherein the registration accept message further includes an extended emergency call number used in the non-public network.

7. The method of claim 5,
wherein the registration accept message further includes a mobile country code (MCC), and
wherein in case that the MCC has a value starting with 9, the registration accept message further includes country information.

8. The method of claim 5, wherein the registration accept message further includes information indicating a type of the emergency call.

9. A user equipment (UE) configured to perform an emergency call in a non-public network, the UE comprising:
a transceiver; and
a processor configured to:
receive, from an access and mobility management function (AMF) through the transceiver, information related to at least one supported non-public network and information indicating whether the at least one supported non-public network supports the emergency call,
transmit, to the AMF through the transceiver, a registration request message including information indicating that the UE requests an emergency call service in the non-public network,
receive, from the AMF through the transceiver, a registration accept message including an emergency call number,
identify whether the registration accept message includes information indicating that the non-public network supports the emergency call service, and
perform the emergency call in the non-public network based on a result of the identification,
wherein the registration request message includes at least one of public warning system (PWS) priority indication information or UE-stand-alone non-public network (UE-SNPN) version information, and
wherein the registration accept message includes at least one of emergency type or valid information indicating whether a call number is valid.

10. The UE of claim 9,
wherein the registration accept message further includes an extended emergency call number used in the non-public network, and
wherein the processor is configured to perform the emergency call using the emergency call number or the extended emergency call number.

11. The UE of claim 9,
wherein the registration accept message further includes a mobile country code (MCC), and
wherein when the MCC has a value starting with 9, the registration accept message further includes country information.

12. The UE of claim 11, wherein the processor is further configured to store or update the emergency call number by using the country information.

* * * * *